United States Patent [19]
Riser et al.

[11] Patent Number: 6,027,237
[45] Date of Patent: Feb. 22, 2000

[54] AIR ROUTER FOR COOLING LIGHT GUIDE BUNDLE

[75] Inventors: Andrew P. Riser, Capistrano Beach; Kyle P. Lucas, San Juan Capistrano, both of Calif.

[73] Assignee: Remote Source Lighting International, Inc., San Juan Capistrano, Calif.

[21] Appl. No.: 08/819,143

[22] Filed: Mar. 17, 1997

[51] Int. Cl.[7] .................................................. F21V 7/04
[52] U.S. Cl. ........................ 362/580; 362/373; 362/294
[58] Field of Search .............................. 362/32, 294, 551, 362/554, 583, 560, 580, 373

[56] References Cited

U.S. PATENT DOCUMENTS

| | | | |
|---|---|---|---|
| 4,050,784 | 9/1977 | Kobayashi | 385/34 X |
| 4,389,698 | 6/1983 | Cibie | 362/32 |
| 4,704,660 | 11/1987 | Robbins | 362/551 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,922,385 | 5/1990 | Awai | 362/551 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,367,590 | 11/1994 | Davenport | 362/551 |
| 5,377,287 | 12/1994 | Lee et al. | 385/31 |
| 5,396,571 | 3/1995 | Saadatmanesh et al. | 385/33 |

FOREIGN PATENT DOCUMENTS

| | | | |
|---|---|---|---|
| 2651283 | 5/1978 | Germany | 362/32 X |
| 63-291012 | 11/1988 | Japan | 385/33 |
| 6174963 | 6/1994 | Japan | 385/24 |
| 2098311 | 11/1982 | United Kingdom | 385/901 X |

Primary Examiner—Sandra O'Shea
Assistant Examiner—Marshall Honeyman
Attorney, Agent, or Firm—Stout, Uxa, Buyan & Mullins, LLP; Donald E. Stout

[57] ABSTRACT

The present invention discloses an air duct for directing air onto an optical fiber bundle coupling. The air duct is used to siphon a portion of an air stream, which is used to cool an arc lamp, to the coupling end of the light guide bundle. After the air from the air duct cools the coupling of the light guide bundle, the air is routed back to provide additional cooling to the arc lamp.

20 Claims, 24 Drawing Sheets

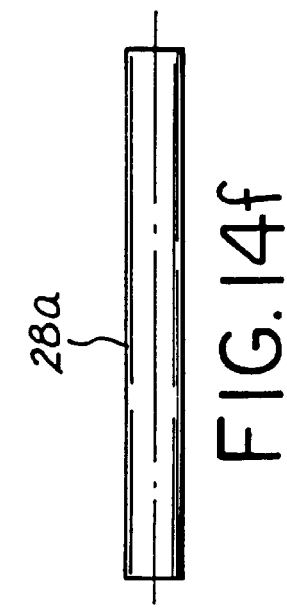

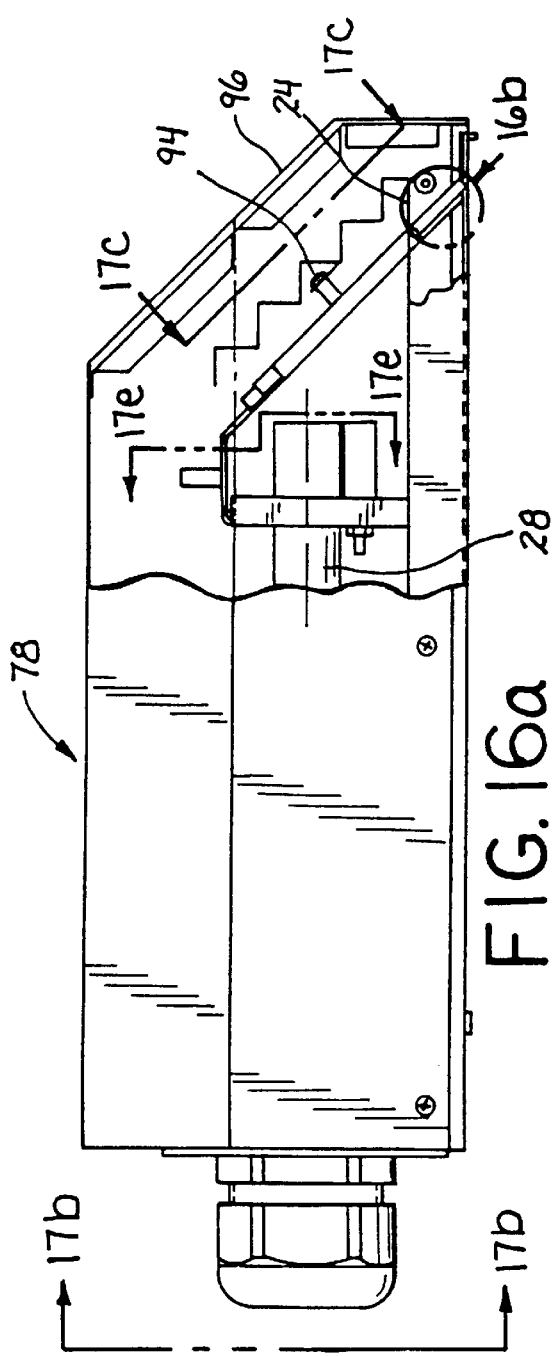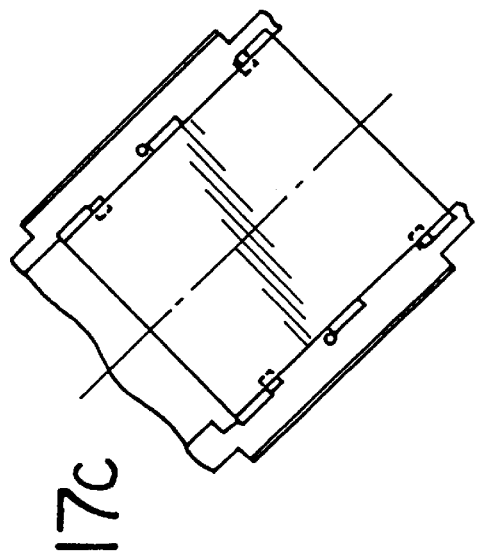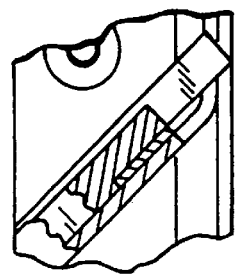

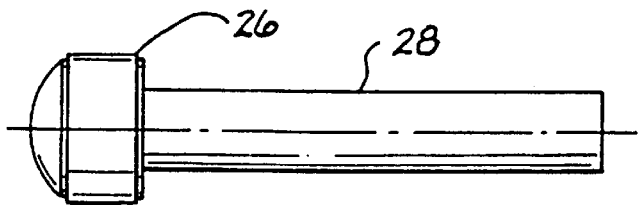
FIG. 21a
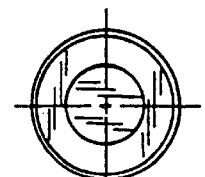
FIG. 21b
FIG. 22a
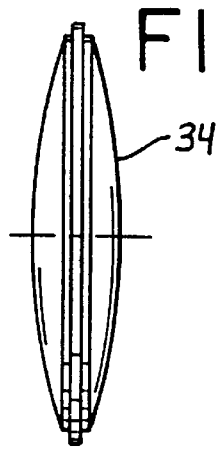
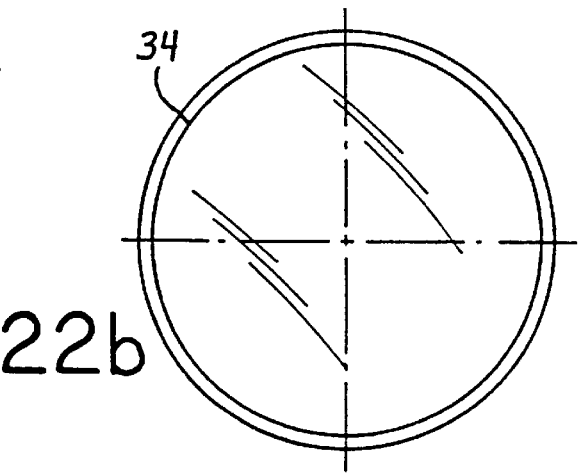
FIG. 22b
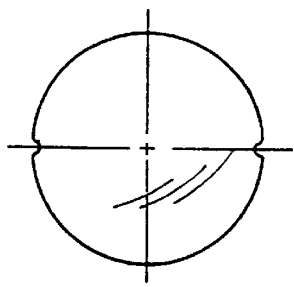
FIG. 23b
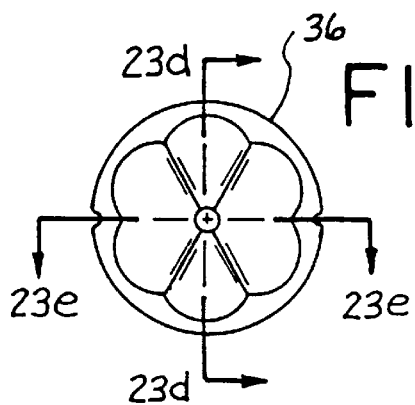
FIG. 23a
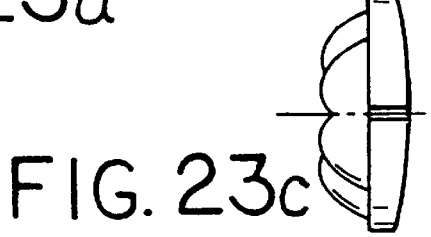
FIG. 23c

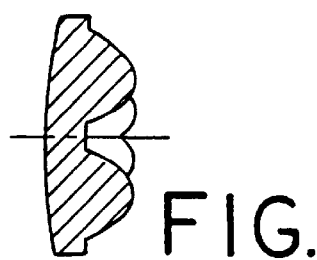
FIG. 23d
FIG. 23e
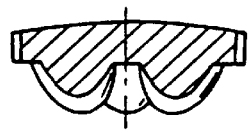
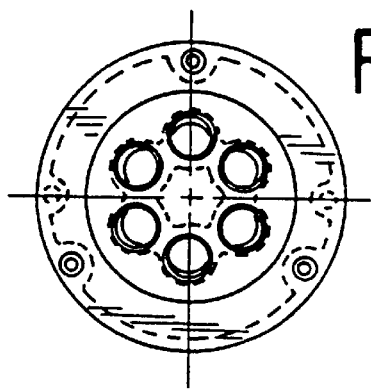
FIG. 24a
FIG. 24b
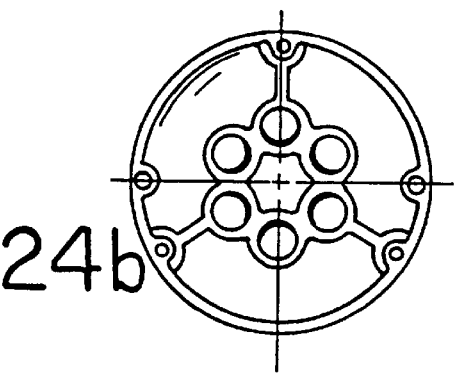
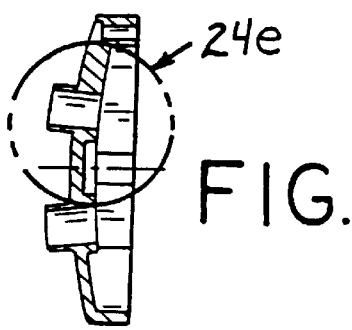
FIG. 24d
FIG. 24c
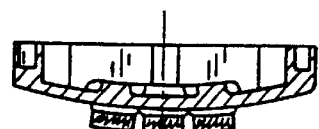
FIG. 24e
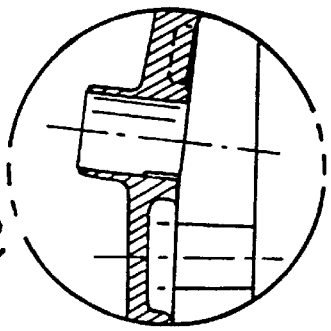

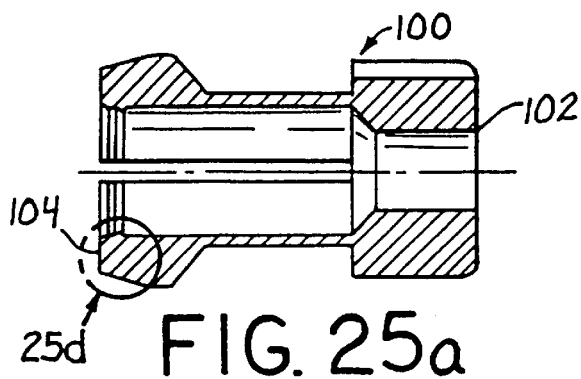
FIG. 25a
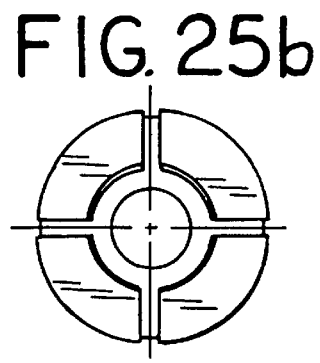
FIG. 25b
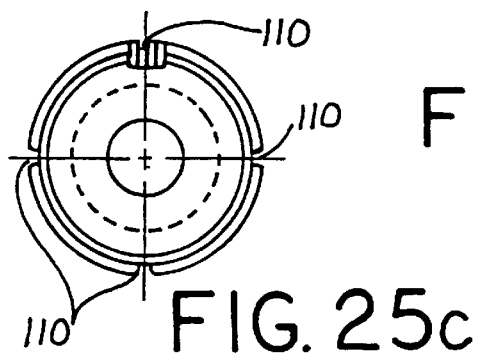
FIG. 25c
FIG. 25d
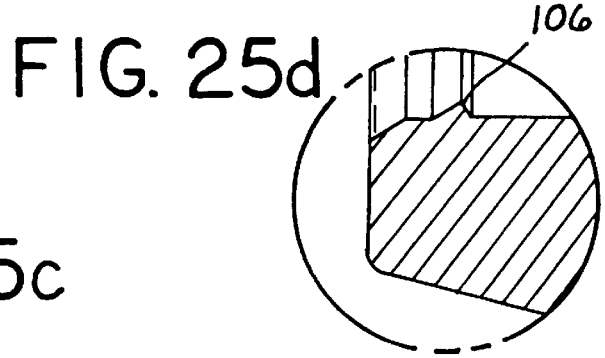
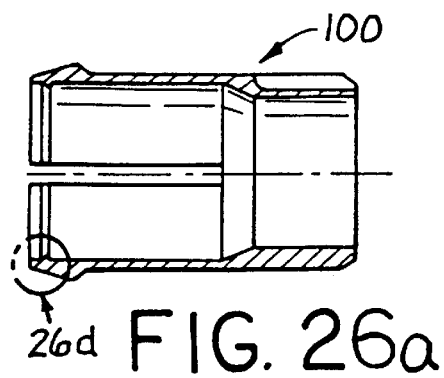
FIG. 26a
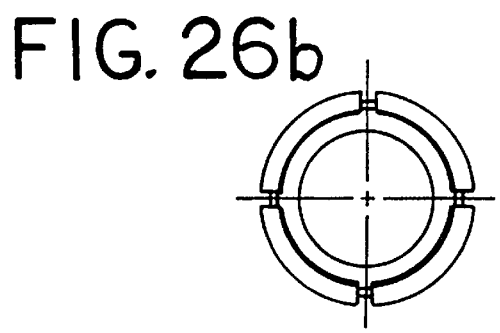
FIG. 26b
FIG. 26c
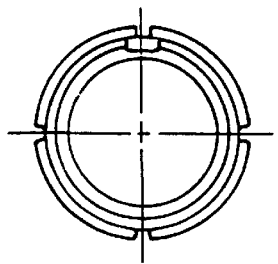
FIG. 26d FIG. 28
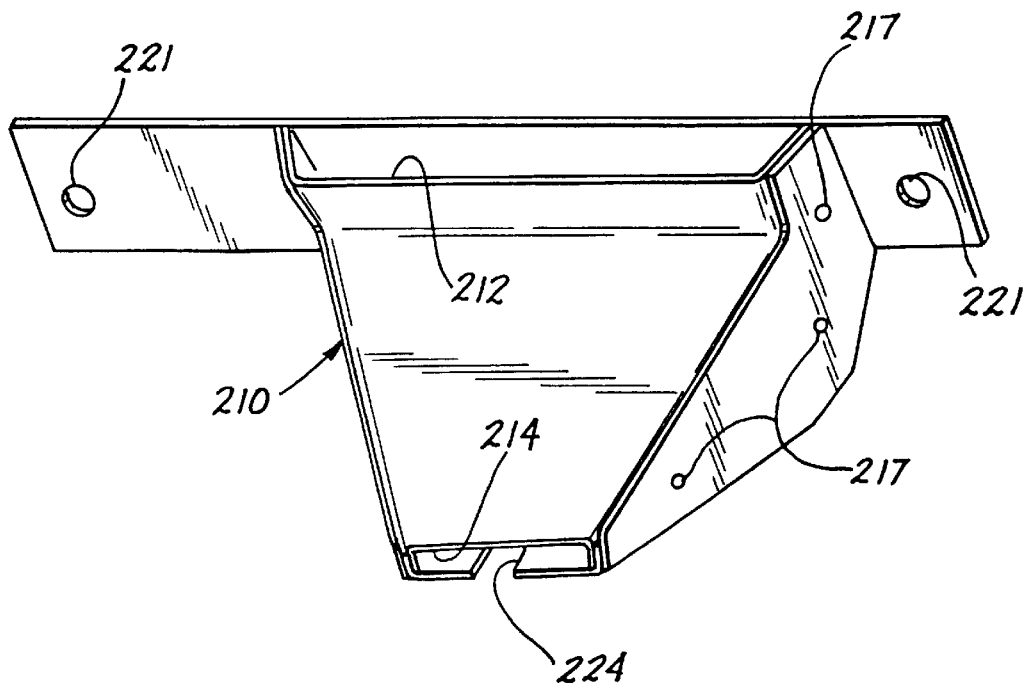
FIG. 29c
FIG. 29d
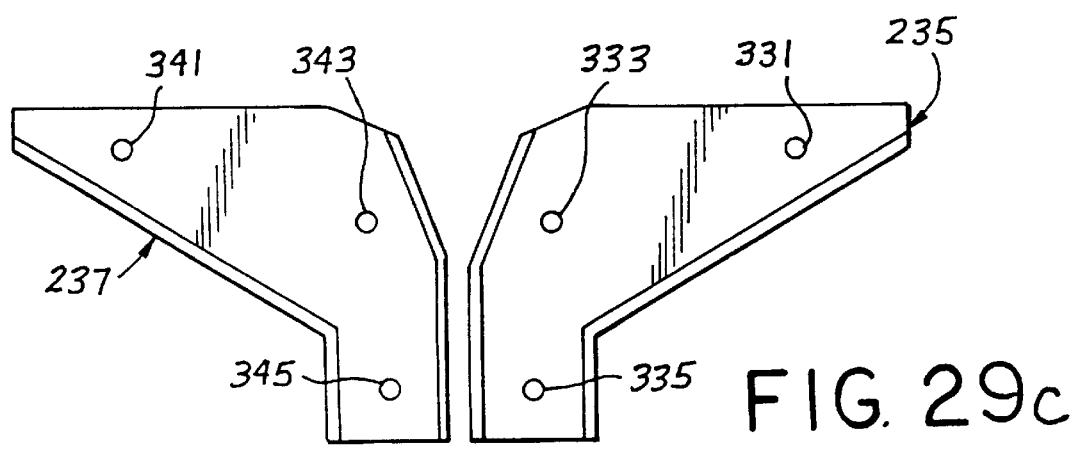

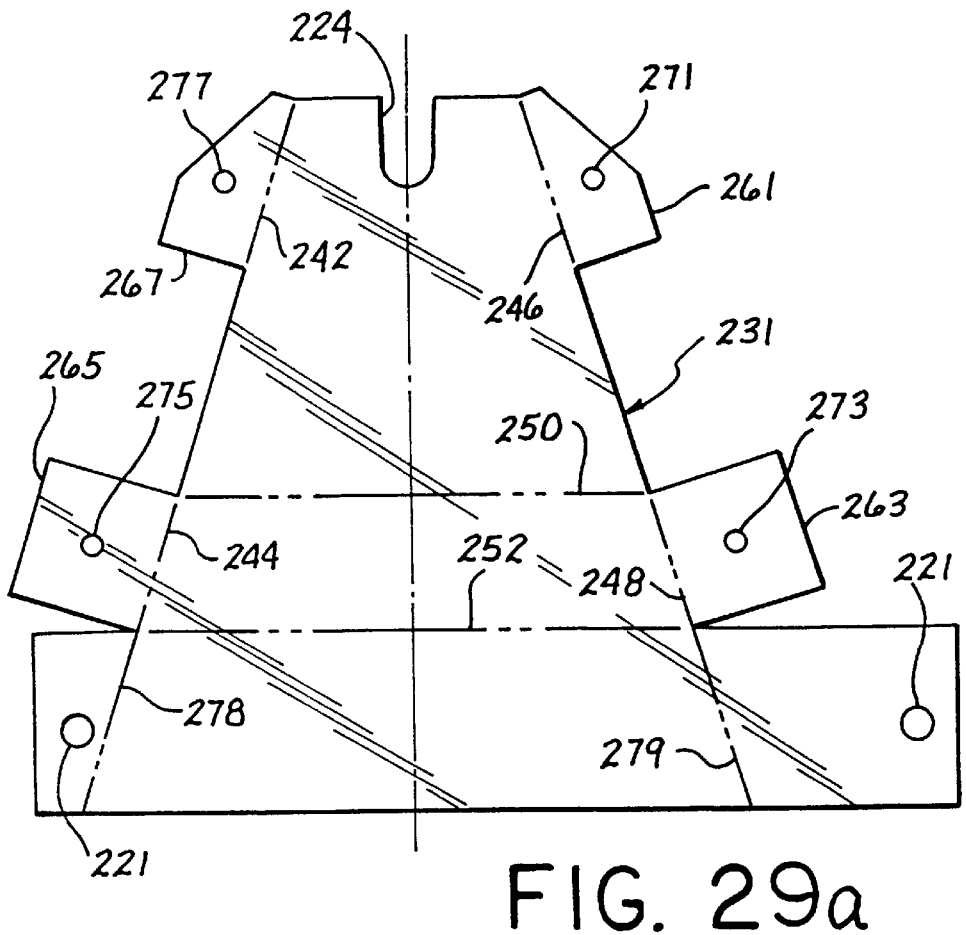
FIG. 29a
FIG. 29b
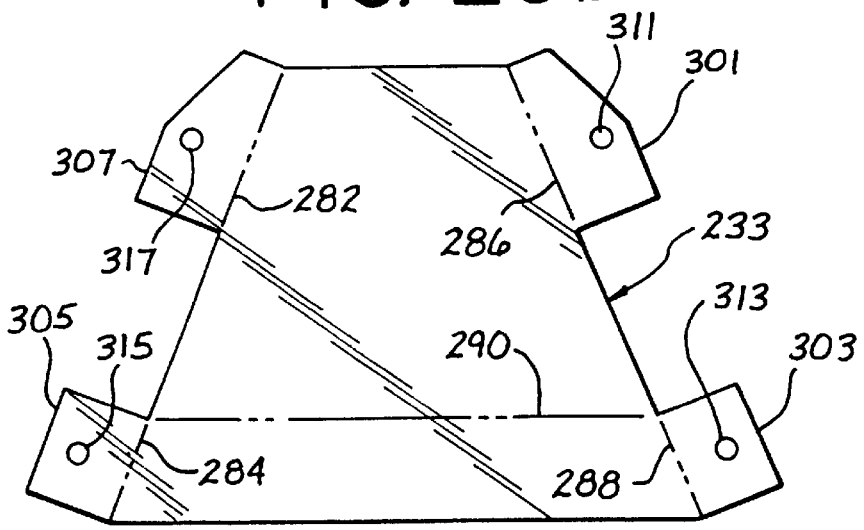

AIR ROUTER FOR COOLING LIGHT GUIDE BUNDLE

This application is related to co-pending U.S. application Ser. No. 08/459,613 filed on Jun. 2, 1995 and entitled MULTIPORT ILLUMINATOR FOR MACR-FIBERS; co-pending U.S. application Ser. No. 08/601,373 filed Sep. 23, 1996 and entitled OPTICAL COUPLER; co-pending U.S. application Ser. No. 08/599,970 filed on Feb. 14, 1996 and entitled OPTICAL COUPLER; co-pending U.S. application Ser. No. 08/645,324, filed on May 13, 1996 and entitled MULTIPORT ILLUMINATOR OPTIC DESIGN FOR MACRO-FIBERS; co-pending U.S. application Ser. No. 08/645,325, filed on May 13, 1996 and entitled MULTIPORT ILLUMINATOR MECHANICAL DESIGN FOR MACRO-FIBERS; co-pending U.S. application Ser. No. 08/645,326, filed on May 13, 1996 and entitled REFLECTOR FOR ILLUMINATION SYSTEM; co-pending U.S. application Ser. No. 08/645,327, filed on May 13, 1996 and entitled REFLECTOR AND ILLUMINATION SYSTEM; co-pending U.S. application Ser. No. 08/743,426, filed on Nov. 1, 1996 and entitled MULTIPORT ILLUMINATOR FOR MACRO-FIBERS; and co-pending U.S. application Ser. No. 08/742,846, filed on Nov. 1, 1996 and entitled REFLECTOR AND ILLUMINATION SYSTEM; and co-pending U.S. application Ser. No. 08/886,822, filed on Mar. 4, 1997 and entitled REFLECTOR AND ILLUMINATION SYSTEM; co-pending U.S. application Ser. No. 08/789,972, filed on Jan. 31, 1997 and entitled MULTIPORT ILLUMINATOR OPTIC DESIGN FOR LIGHT GUIDES; co-pending U.S. application Ser. No. 08/792,563, filed on Jan. 31, 1997 and entitled BIPLANAR MULTIPORT ILLUMINATOR DESIGN FOR LIGHT GUIDES; co-pending U.S. application Ser. No. 08/789,965, filed on Jan. 31, 1997 and entitled SPHERICAL MULTIPORT ILLUMINATOR DESIGN FOR LIGHT GUIDES; all of which are commonly assigned and the contents of which are expressly incorporated herein by reference.

BACKGROUND OF THE INVENTION

1. Field of the Invention

The present invention relates generally to light guide illumination systems and, more particularly, to air circulation cooling devices for use with light guide illumination systems.

2. Description of Related Art

Large diameter fiber optics, often referred to as "flexible light guides", are well known in the art, and typically comprise a single, solid core light guide which is surrounded by a cladding layer and a sheath or shielding layer. The core is the portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter light guides, which are typically used to transmit information in relatively complex control systems, these large diameter "light guides" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), and jail cells. Large diameter light guides are particularly advantageous in that only a single centralized illumination system must be maintained, rather than a plurality of individual lights.

There are problems, however, in implementing state of the art light guide illumination systems because of the difficulty of illuminating a plurality of light guides from a single illumination source, as is discussed in U.S. Pat. No. 5,559,911, which is expressly incorporated by reference herein. According to one prior art configuration, the light guides are bundled as closely as possible, to ensure the maximum ratio of core area (the part of each light guide which actually transmits light) to total area. However, bundling the large diameter light guides together in order to illuminate them from the single illumination source is difficult to do efficiently. The individual light guides are round and thus have a great deal of space between them due to the cladding and shielding layers. To obtain maximum efficiency, it is desirable to illuminate only the core of each of the bundled light guides, but this is impossible using state of the art bundling techniques. Necessarily, if the light from the source of illumination is spread across the array of light guides, it will illuminate not only the cores of the light guides, but also the cladding layers and shielding layers. Furthermore, the voids between the light guides, which are inevitable because of the light guides' round dimensions, also are impacted by the light from the illumination source. All of the light falling upon any element other than the cores is wasted, and becomes an efficiency loss, since it will not be transmitted by the light guides.

Light falling on elements other than the cores of the light guides generates heat thereon, which is undesirable. This heat on the ends of the light guides if too great will need to be dissipated, requiring additional equipment. Since the coupling of the light into the light guide bundle generates heat, an air duct is used to siphon a portion of an air stream, which is used to cool the arc lamp, to the coupling end of the light guide bundle. After the air from the air duct cools the coupling of the light guide bundle, the air can be routed back to provide additional cooling to the arc lamp.

A number of prior art approaches use reflectors for focussing light from a source of illumination into one or more light guides. U.S. Pat. No. 5,222,793 and U.S. Pat. No. 5,259,056, both to Davenport et al., disclose lighting systems which use a single reflector assembly for illuminating light transmissive elements. U.S. Pat. No. 5,396,571 to Saadatmanesh et al. discloses a multi-segmented lens which divides light from a light beam into four separate beams, each of which is focussed onto a separate light guide. U.S. Pat. No. 4,912,605 to Whitehead discloses an electric light source mounted between two reflectors, each of which directs light into a corresponding light guide. U.S. Pat. No. 5,469,337 to Cassarly et al. discloses a light source and a plurality of curved reflectors for focussing light into lenses and then into a plurality of light guides. The use of reflectors and multi-segmented lenses by the prior art for coupling light into light guides has represented some advancement over the prior art bundled light guides, but the need for a proper and efficient coupling of a light source to a plurality of light guides still remains.

Another problem associated with prior art designs is the large number of optical components associated with these designs. Reducing the number of parts of any optical design would appear to be advantageous to any system.

SUMMARY OF THE INVENTION

This invention couples the light originating from an arc lamp, or similar source, into a light guide bundle. Such a system is to be used in transmitting illumination from a central source to a variety of remote locations. An air duct is used to route air over a light receiving end of the light guide bundle. The combination of the several elements of the inventive system results in an effective transfer of the energy of the light source to the light guides. The system also provides a very flexible mechanical means for distributing the energy to the light guides and to the remote locations at which the light is used.

The invention, together with additional features and advantages thereof may best be understood by reference to the following description taken in conjunction with the accompanying illustrative drawings.

BRIEF DESCRIPTION OF THE DRAWINGS

FIG. 2 is an enlarged schematic view of the lamp and right portion of the dual reflector illustrated in FIG. 1a;

FIG. 3 is an end view of the dual reflector, taken along lines 3—3 in FIG. 1a;

FIG. 4 is schematic side view illustrating the multi-sector lens which forms a part of the optical system shown in FIG. 1a;

FIG. 13 is a partial cross-sectional view of a side module, according to the presently preferred embodiment;

FIGS. 14a–14f illustrate other views of a side module and interior portions of the side module, according to the presently preferred embodiment;

FIGS. 16a and 16b illustrate two views of a first side module configuration, according to one presently preferred embodiment;

FIGS. 17a–17e illustrate various views of the side module of FIGS. 16a and 16b, according to the presently preferred embodiment;

FIGS. 21a and 21b illustrate a homogenizer rod for use with the side module of FIGS. 19a and 19b, according to one presently preferred embodiment;

FIGS. 22a and 22b illustrate a focussing lens for use with the side module of FIGS. 19a and 19b, according to one presently preferred embodiment;

FIGS. 23a–23e illustrate various views of a multi-sector lens for use with the side module of FIGS. 19a and 19b, according to one presently preferred embodiment;

FIGS. 24a–24e are various views of a ferrule housing assembly for use with the side module of FIGS. 19a and 19b, according to one presently preferred embodiment;

FIGS. 25a–25d are various views of a first ferrule for use with the ferrule housing assembly of FIGS. 24a–24e, according to one presently preferred embodiment;

FIGS. 26a–26d are various views of a second ferrule for use with the ferrule housing assembly of FIGS. 24a–24e, according to one presently preferred embodiment;

FIG. 28 illustrates a perspective view of the air duct, according to the presently preferred embodiment; and FIGS. 29a–29d illustrate various planar members which fit together to form the air duct, according to the presently preferred embodiment.

DESCRIPTION OF THE PREFERRED EMBODIMENT

Figure 1A:
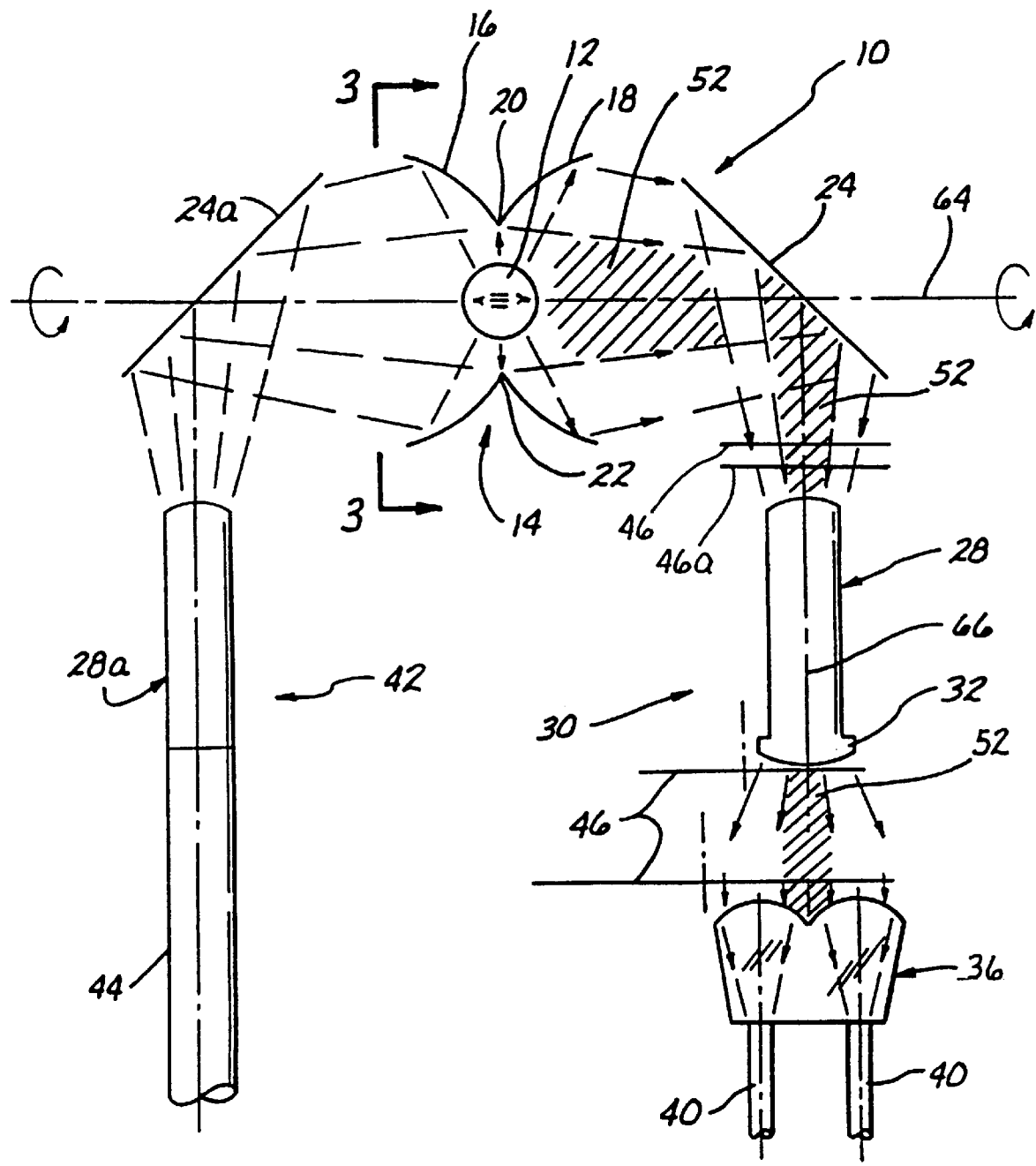
FIGS. 1a and 1b are schematic top views of optical systems according to the present invention.

Turning to FIG. 1a, an optical system 10 is illustrated which includes a compact light source 12, which may comprise an arc lamp or any other conventional means for emitting light. This light source 12 is placed at the focus of a dual curved reflector 14, which comprises two reflector portions 16 and 18 which are disposed in a back-to-back fashion. In each reflector portion 16, 18, the center or vertex region of the reflector has been removed, as illustrated, and the two reflector portions are joined at intersection points 20 and 22.

Figure 1B:
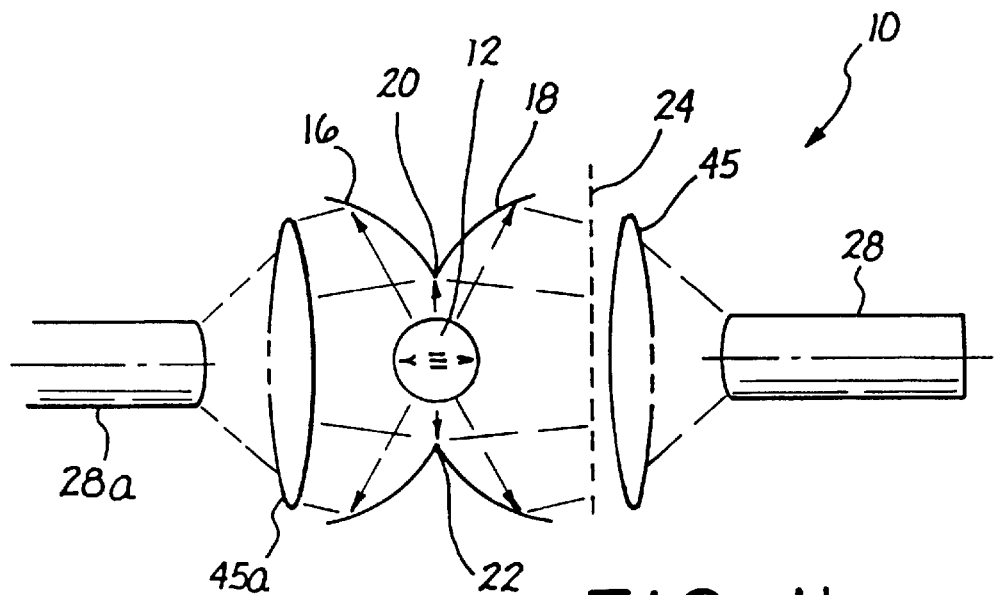

Light emitted from the light source 12 is reflected by the dual reflector 14, as illustrated by the lines of incidence shown in FIG. 1a, in two opposing directions, and is then directed through an angle of approximately 90 degrees (or any other desired angle) by each of two flat reflectors or fold mirrors 24 and 24a, respectively. The fold mirrors function to reflect heat generated by the light source 12, and to re-direct the light emitted from light source 12 to output light guides 40. Alternatively, particularly in a linear system using a dual reflector, as illustrated in FIG. 1b, ultra-violet (UV) and/or infrared (IR) radiation blocking coatings may be placed on the exit lens faces 32, since the fold mirrors 24 and 24a are not used, or hot mirrors 24' may be used for reflecting UV and IR radiation. The hot mirrors 24' may be placed at any stage between the light source and the output light guides and, further, may be placed at perpendicular or off-axis orientations.

Each focussed beam of light impinges on a respective one of the circular homogenizer rods 28, 28a. Although each homogenizer rod preferably comprises a circular cross-section, other cross-sections, such as rectangular, for example, may also be used. Each of the two homogenizer rods 28, 28a preferably comprises a transparent material, such as glass or clear plastic, and is adapted to integrate the light beam by means of multiple reflections within the homogenizer rod. The homogenizer rods may be omitted in alternative embodiments of the present invention.

Figure 4:
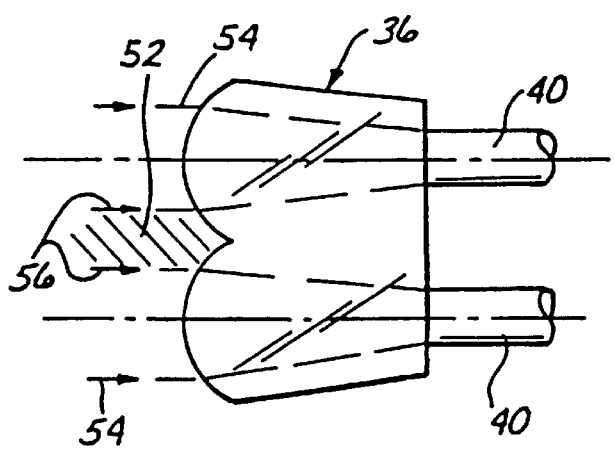
Figure 5:
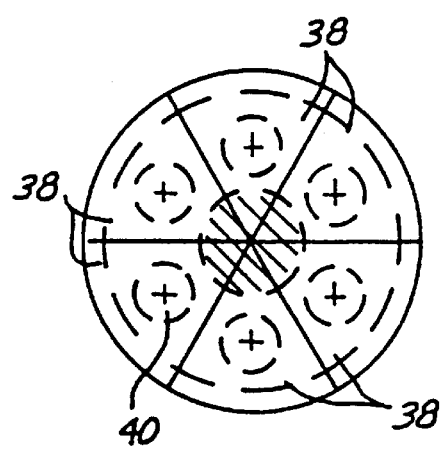
FIG. 5 is an end view of the multi-sector lens shown in FIG. 4.

On the right side of the system, or right channel 30, as illustrated in FIG. 1a, the light beam emerges from the homogenizer rod 28 at the exit lens face 32. The diverging beam from the homogenizer rod 28 is then focussed and split into a number of separate focussed beams by means of a multi-sector lens 36 (FIGS. 1a, 4, and 5). Each of the lens sectors 38 (FIG. 5) focusses onto the core of a corresponding output light guide 40. If an electrodeless lamp or a very high lumen output lamp is to be used, the light guides preferably comprise light guides which are rated for the proper lumen output. For high-lumen output cases, the light guides will often comprise a non-plastic material.

In a conventional optical design, a focussing lens would likely be required between the circular homogenizer rod 28 and the multi-sectored lens 36. The multi-sectored lens 36 of the present invention, however, is modified over conventional lenses to obviate any need for a focussing lens. For example, the multi-sectored lens 36 is larger than would be required with a conventional focussing lens between the multi-sectored lens 36 and the circular mixing rod 28. Alternatively, a conventional focussing lens may be used with the multi-sectioned lens 36, as illustrated in FIGS. 9a–9d, for example.

The optical system for the left beam of FIG. 1a focussed by the dual reflector 14 through the left channel 42 can be essentially the same as that described with respect to the right channel 30, or some different features may be incorporated into the left channel. For example, the right channel 30 may have a sector lens accommodating ten output light guides, while the left channel 42 may only couple to a single large light guide or multi-light guide bundle 44. In the embodiment of FIG. 1b, the focussing lens 45 focusses light from the second reflector portion 18 to the circular homogenizer rod 28. The focussing lens 45 may be used instead of, or in addition to, either of the fold mirrors 24 and 24a in the right and left channels 30 and 42, respectively, according to design parameters.

A useful feature of the invention, as illustrated in FIG. 1a, is to incorporate two rotating color wheels 46 and 46a at the entrance of the mixing rod 28. The rotating color wheels 46, 46a can be disposed at the exit of the homogenizer rod 28 or, alternatively, in front of the sector lens 36. With the color wheels 46, 46a at the mixing rod exit, the color of the light to all of the light guides is the same and changes simultaneously as the wheels rotate. With the wheels near the entrance to the sector lens 36, the colors to each light guide are different and can change at different rates depending on the pattern of the wheels. These various color controls are useful in pool lighting, signs, and other applications.

Figure 2:
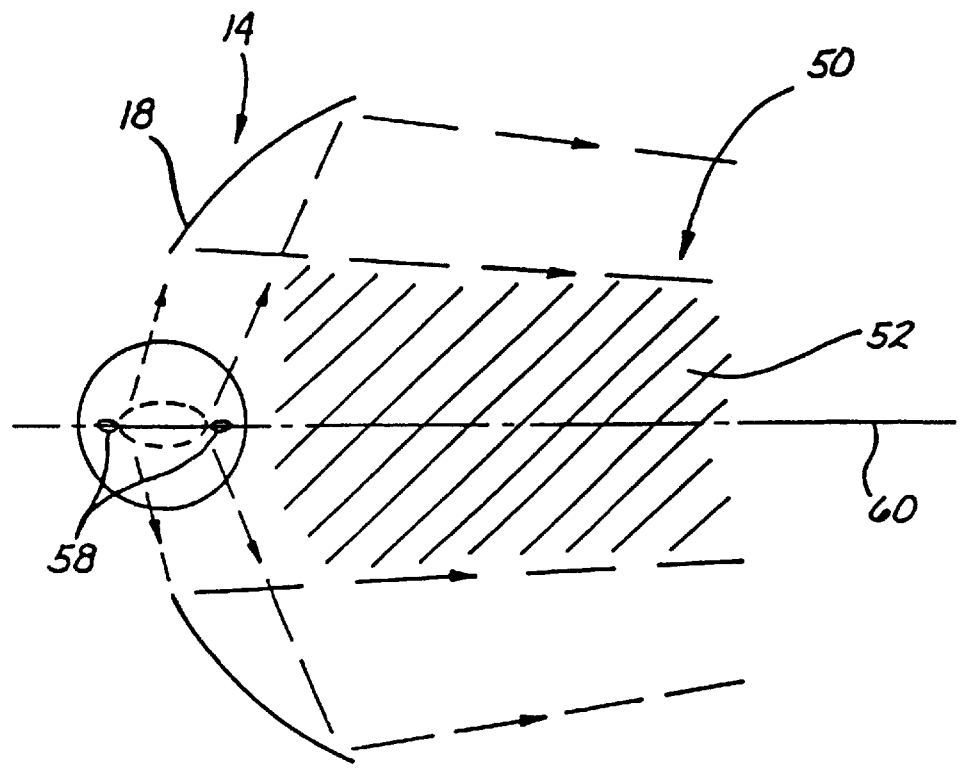
Figure 3:
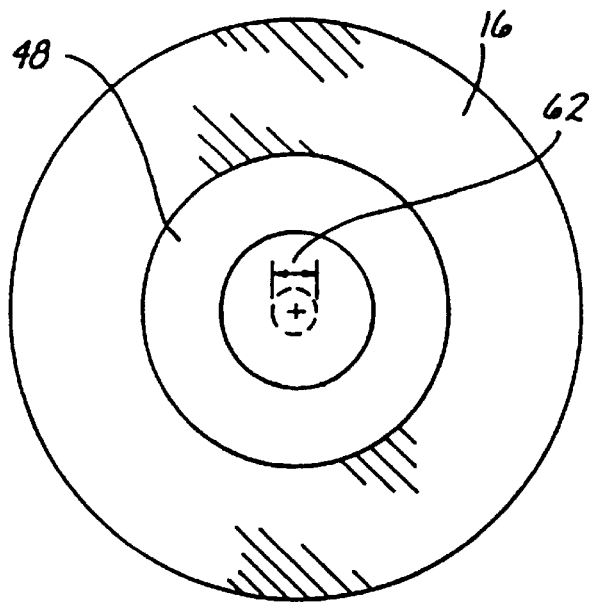

The high efficiency of this illumination system derives from the special design of a number of its elements working singly and in combination. The reflector 14 consists of two axially symmetrical curved halves or portions 16 and 18, with the lamp centered at their matching plane. This arrangement makes use of the very efficient collection properties of the low magnification section of the ellipsoidal (or near ellipsoidal) reflector shape. The large hole 48 in the center of each reflector-half (FIG. 3) results in a focussed light beam with a ring-shaped cross section. The light entering the hole in the reflector is not lost but passes into the opposite reflector-half and is focussed into the second focussed beam. This reflector arrangement efficiently generates a ring cross-section beam which is very useful in reducing the radial aperture required of each of the sector lenses 38. FIG. 2 shows a section through the right portion 18 of the dual reflector 14 indicating how the ring-shaped beam 50 is generated. The ring-shaped beam 50, wherein the darkened center portion 52 is represented by cross-hatching, is preserved through the homogenizer rod 28.

As shown best in FIG. 4, the ring-shaped beam impinges on the sector lens 36 as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter light guides, thus unexpectedly increasing the efficiency of the system. The minimum light guide diameter is controlled by the need to match the angular extent of the output beam to the numerical aperture of the light guide.

Another important feature of the invention is the orientation of the light source 12. As illustrated particularly in FIG. 2, the light source 12 is shown at the focal point of the dual reflector 14. The long dimension of the arc discharge of the light source 12, as defined by the position of the electrodes 58, is oriented so as to be substantially parallel and coincident with the reflector symmetry axis 60. The efficiency of transmission of the optical system is greatly influenced by the arc orientation with respect to the reflector because of the high length-to-diameter ratio (typically about five times) of the arc. By aligning the light source 12 as described, the small dimension 62 of the arc (FIG. 3) becomes the controlling parameter in defining the minimum permissible output light guide diameter for efficient coupling. Small output light guide diameter is usually desired in most applications. A design for a small light guide will also, in general, provide efficient coupling to larger light guides provided the numerical aperture of the larger light guide is the same or larger than the smaller light guide. In the presently preferred embodiment, the output light guide core diameter is nominally one half inch. This large diameter may be desired because the high output power of the light source can burn smaller light guides in some cases. Additionally, the sector lens of the present invention, which obviates any need for a focussing lens, has an aspheric shape that can be specified using standard optical equations.

Although six equal lens sectors 38 are illustrated in FIG. 5, the sector lens 36 can have as few as two and up to twelve or more sectors. Also, the sectors need not be equal in area, since in some applications it may be desirable to deliver different amounts of light to different locations. The presently preferred embodiment, which is illustrated in FIGS. 9–29, comprises six equal area sectors. The sector lens as a means of splitting the incident beam has an advantage over currently used bundled light guides in that the sector lens array separates the light guides from each other (FIGS. 4 and 5), thereby permitting easy installation and removal of individual light guides.

As previously mentioned, the fold reflectors 24, 24a may serve a multiple function of folding mirror and heat rejecting mirror. As a folding mirror, they may be used with or without a hot light source 12, and provide the ability of rotating the entire output optical system around a mechanical axis 64, as best shown in FIG. 1a. This feature is very useful in allowing great flexibility in positioning the direction in which the light guides emerge from the unit. Independent rotation of the fold mirrors 24 and 24a on either side of the light source 12 provides additional flexibility of output light guide location.

As described above, the circular homogenizer rod 28 (as well as homogenizer rod 28a) is used to integrate the angular distribution of the light around the rod axis 66. This is advantageous since it allows the light output of each light guide to be identical (which is usually desired), because the angular light distribution from the light source 12 is not generally uniform. Additionally, the light source 12 will often have some color differences in the angular distribution which also needs to be integrated out in order to avoid undesirable color differences in output between light guides.

Mechanically, the field lens portion 32 of the homogenizer rod is larger in diameter than the rod section itself in order to provide a loss-free means of mounting the homogenizer rod 28. Anything touching the homogenizer rod surface will bleed off some of the internally reflected light unless the rod is clad, which is a disadvantageous approach since it reduces its numerical aperture and increases its cost. Each homogenizer rod may be coated with a low-index material according to one embodiment of the present invention.

The field lens portion 32 in conjunction with each individual lens sector 38 comprises a relay lens system that roughly images the output end of the homogenizer rod onto the light guide port. The lens sectors may have aspheric shapes to reduce aberrations and improve efficiency, and are preferably given a thickness such that the output beam is focussed on the rear surface of the lens sector. This allows the soft core of the usual type of light guide to "wet" the lens surface, thereby reducing reflection losses at this interface. In another embodiment of the present invention, air gaps can be maintained between the light guides 40 and the lens sector 38 surfaces.

Figure 6:
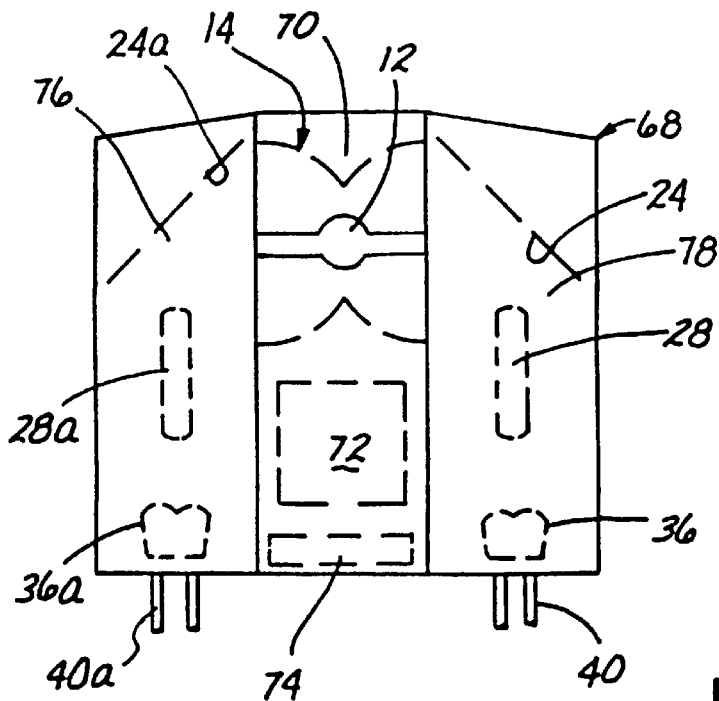
FIG. 6 is a schematic top view of an inventive light guide illumination unit, illustrating a housing containing the system elements shown in FIG. 1.
Figure 7:
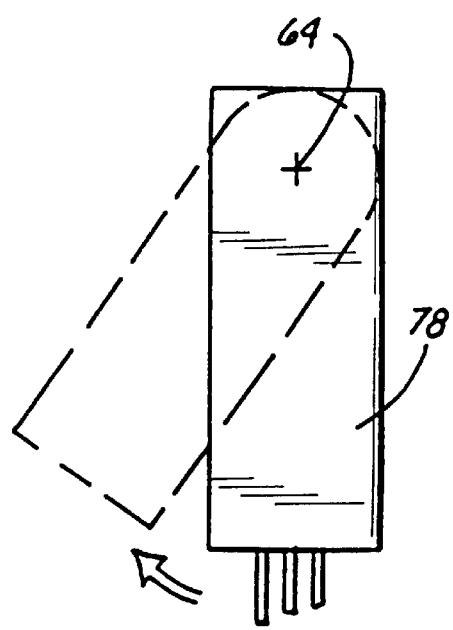
FIG. 7 is a schematic side view of the unit illustrated in FIG. 6.
Figure 8:
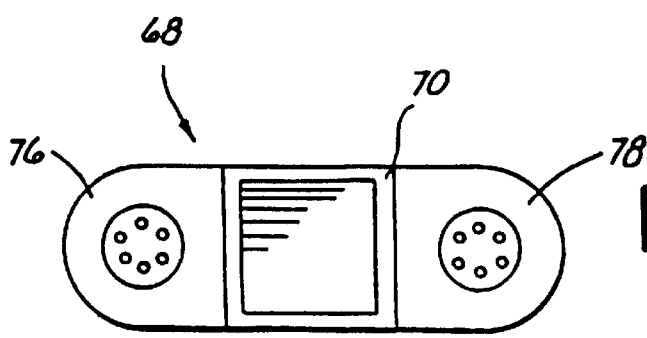
FIG. 8 is a schematic front view of the unit illustrated in FIGS. 6 and 7.

An exemplary complete light guide illumination unit 68 having a modular dual-port construction, is illustrated schematically in FIGS. 6 through 8. The center module 70 of the unit contains the light source 12 and its dual reflector 14, together with a power supply 72, cooling fan 74, and all other associated electrical wiring, etc. Two side modules 76 and 78 preferably contain the fold mirrors 24 and 24a, the homogenizer rods 28 and 28a, optional focussing lenses 34 and 34a and sector lens assemblies 36 and 36a that feed into the light guides 40 and 40a. As discussed in connection with FIG. 1a, although the two modules 76 and 78 are substantially identical, there is no requirement that they be so. Having different sector lenses on either side allows coupling to a different number of light guides on the two sides. Advantageously, the side modules 76 and 78 do not contain any electrical wiring and therefore can be detached easily from the center source module 70, using ordinary mechanical fasteners. The side modules can be rotated about the mechanical axis 64, as discussed in connection with FIG. 1 and shown in FIG. 7, in order to allow convenient placement of the light guide output ports. This feature permits great flexibility for lighting installations with tight space restraints, in building utility closets and the like.

Figure 9A:
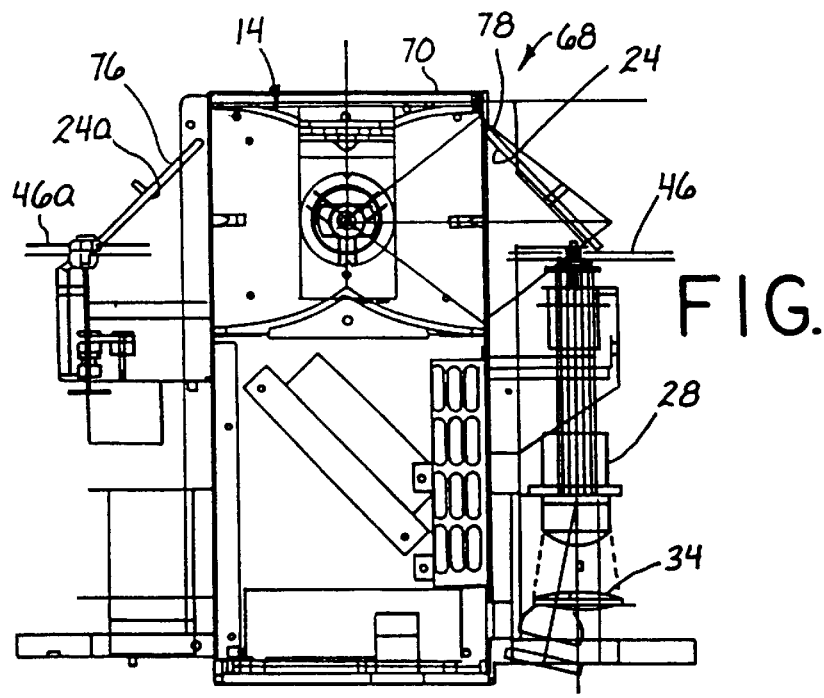
FIGS. 9a–9d are various views of the fiber illumination unit, according to the presently preferred embodiment.
Figure 9C:
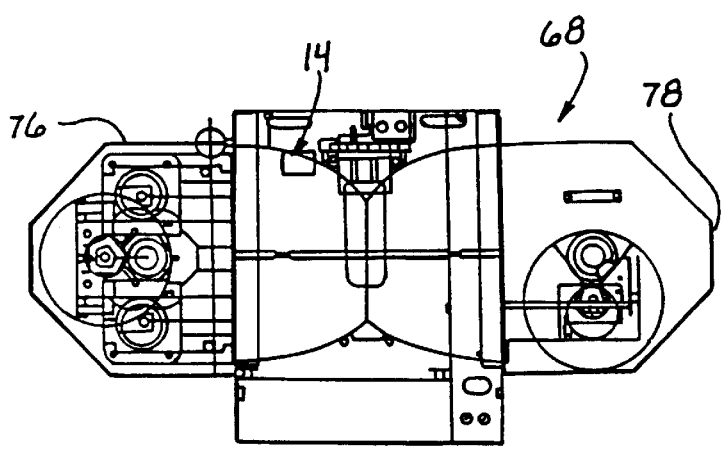
Figure 9D:
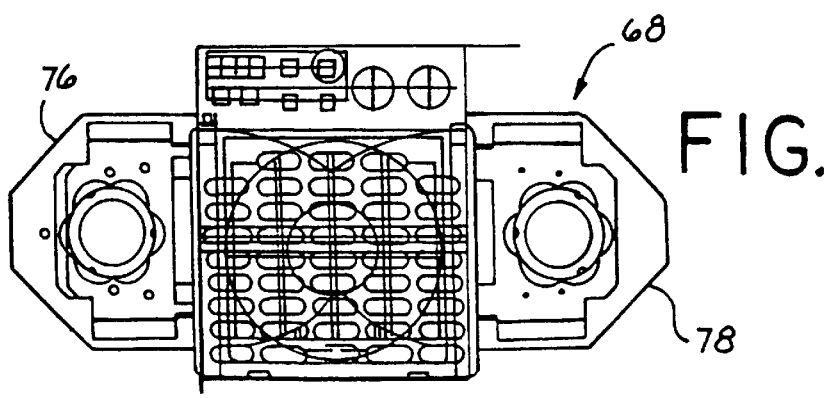
Figure 9B:
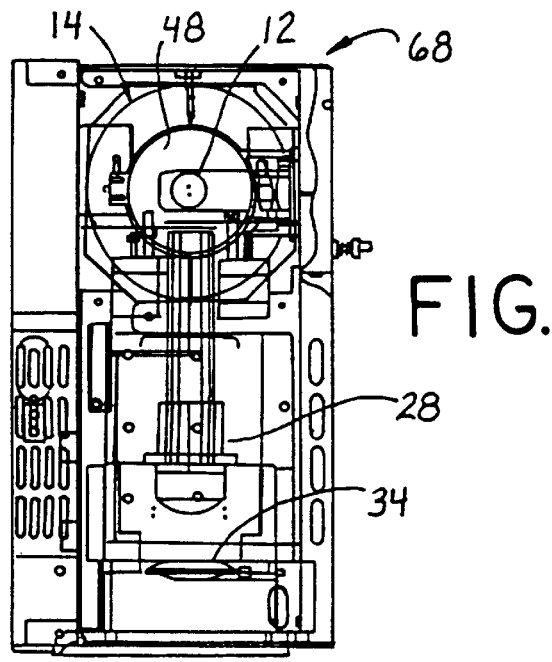

FIG. 9a illustrates a top-planar view of the fiber illumination unit 68 according to the presently preferred embodiment. As presently embodied, two color wheels 46, 46a are disposed between the fold mirror 24 and the homogenizer rod 28, and two color wheels 46, 46a are disposed between the fold mirror 24a and a second homogenizer rod (not shown). FIG. 9b illustrates a side view of the fiber illumination unit 68, and FIGS. 9c and 9d illustrate end views of the fiber illumination unit 68.

Figure 10C:
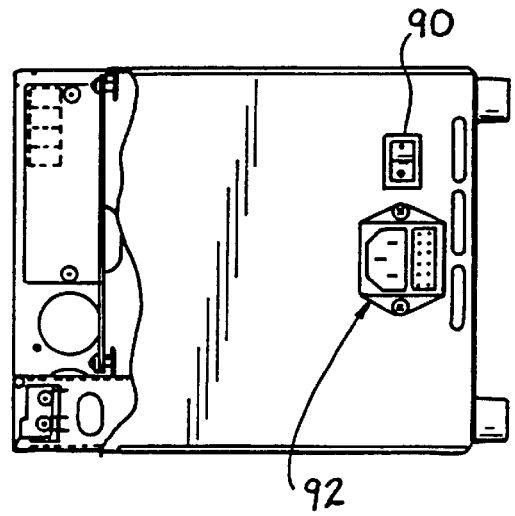
FIGS. 10a–10e are various views of the center source module, according to the presently preferred embodiment.
Figure 10A:
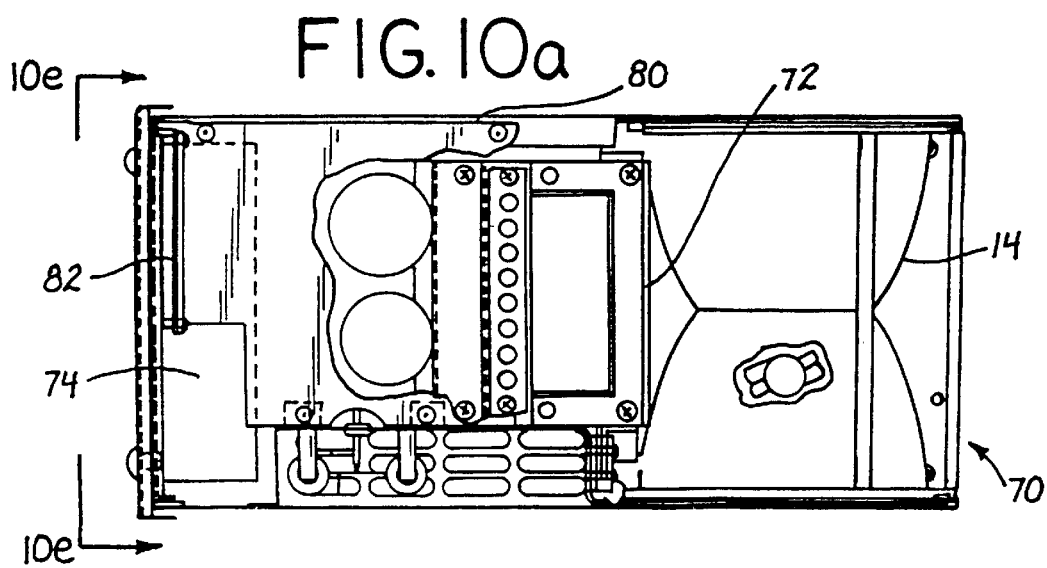
Figure 10B:
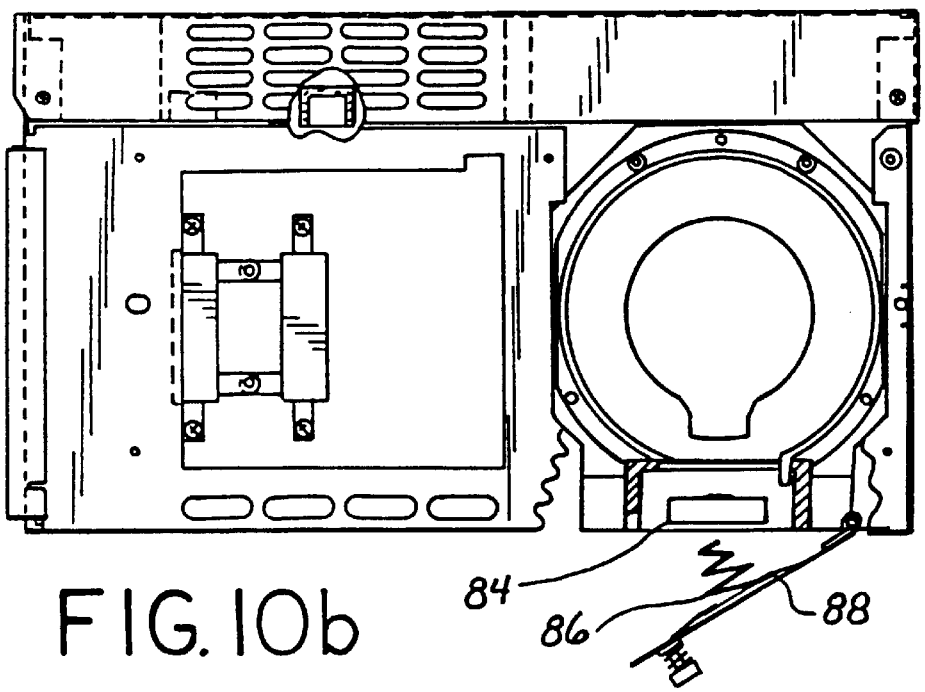
Figure 10D:
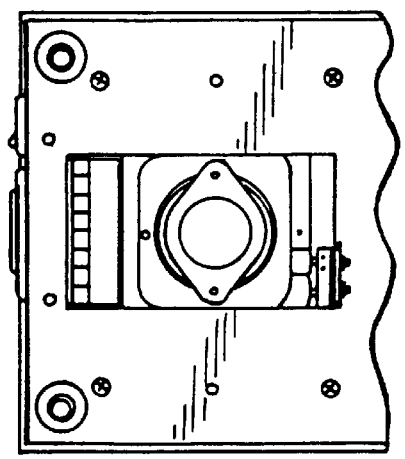
Figure 10E:
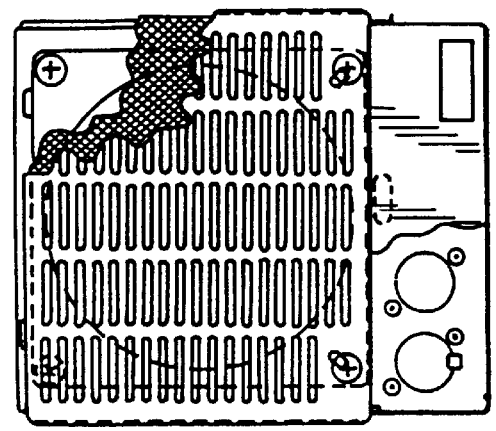

Turning to FIG. 10a, a top-planar view of the center source module 70 illustrates the power supply module 72, the cooling fan 74, a PCA DMX board 80, and a PCA display 82. A side view of the center source module 70 illustrates a harness lamp socket 84, a compression spring 86, and a hinged door 88. The end views shown in FIGS. 10c and 10d illustrate an on/off switch 90 and an AC electrical outlet 92. FIG. 10e illustrates a side view of the center source module 70, taken along line 10e—10e of FIG. 10a, and FIG. 11 illustrates an electrical schematic representation of the center source module 70.

Figure 11:
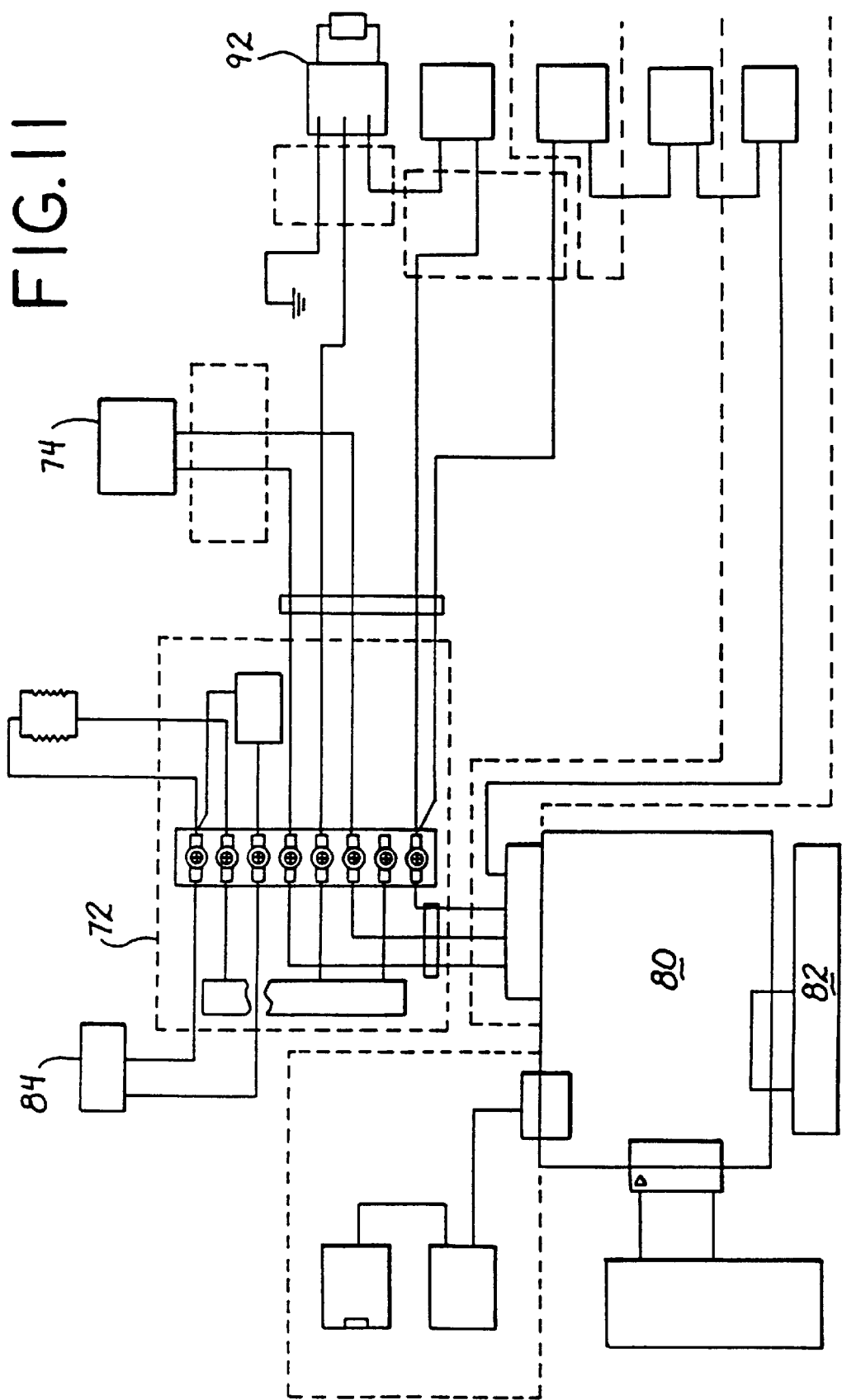
FIG. 11 is a schematic electrical diagram of the center source module, according to the presently preferred embodiment.
Figure 12A:
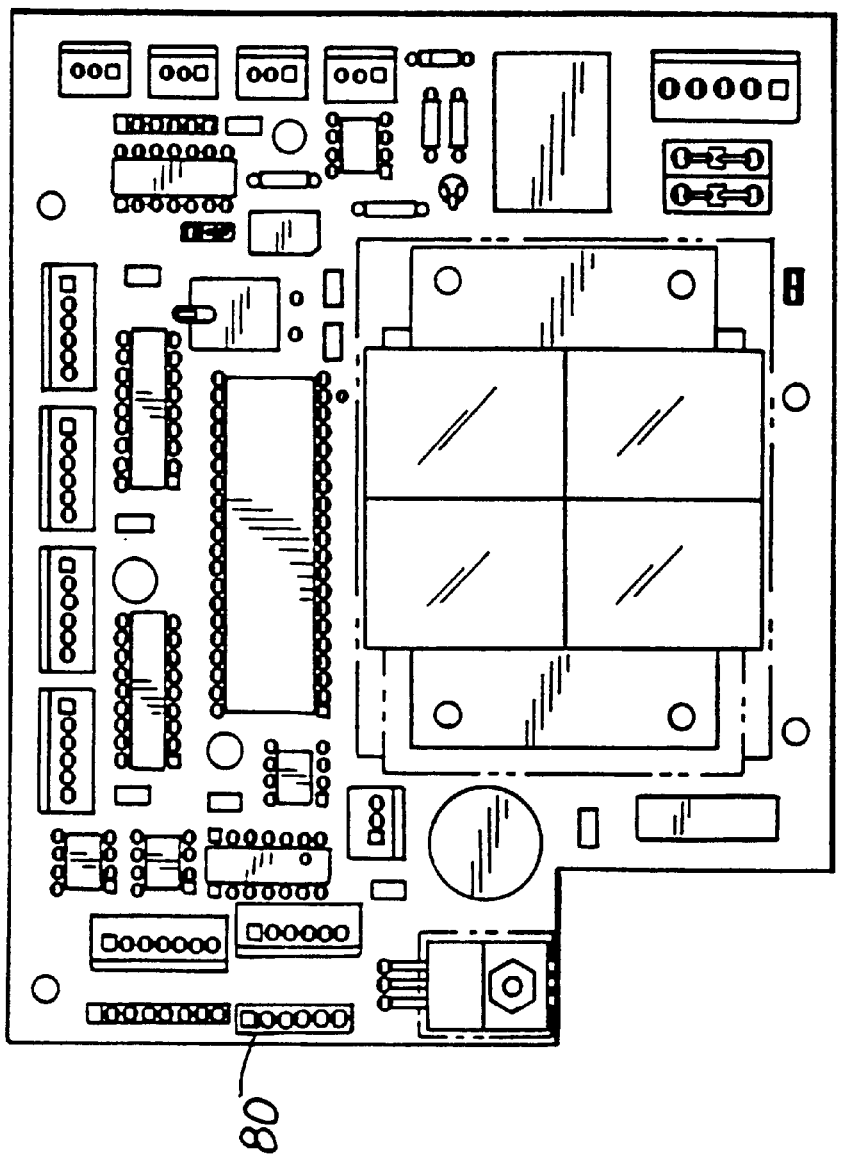
FIGS. 12a–12d illustrate various views of the PCA, DMX control system, according to the presently preferred embodiment.
Figure 12C:
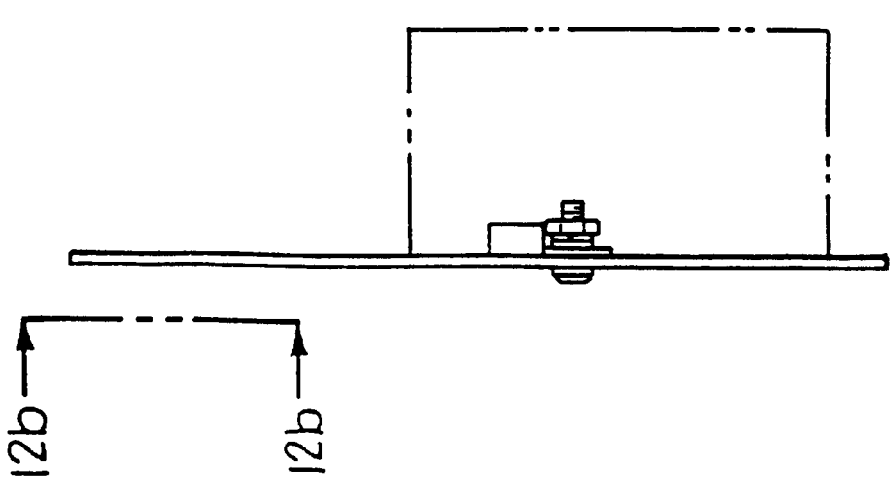
Figure 12B:
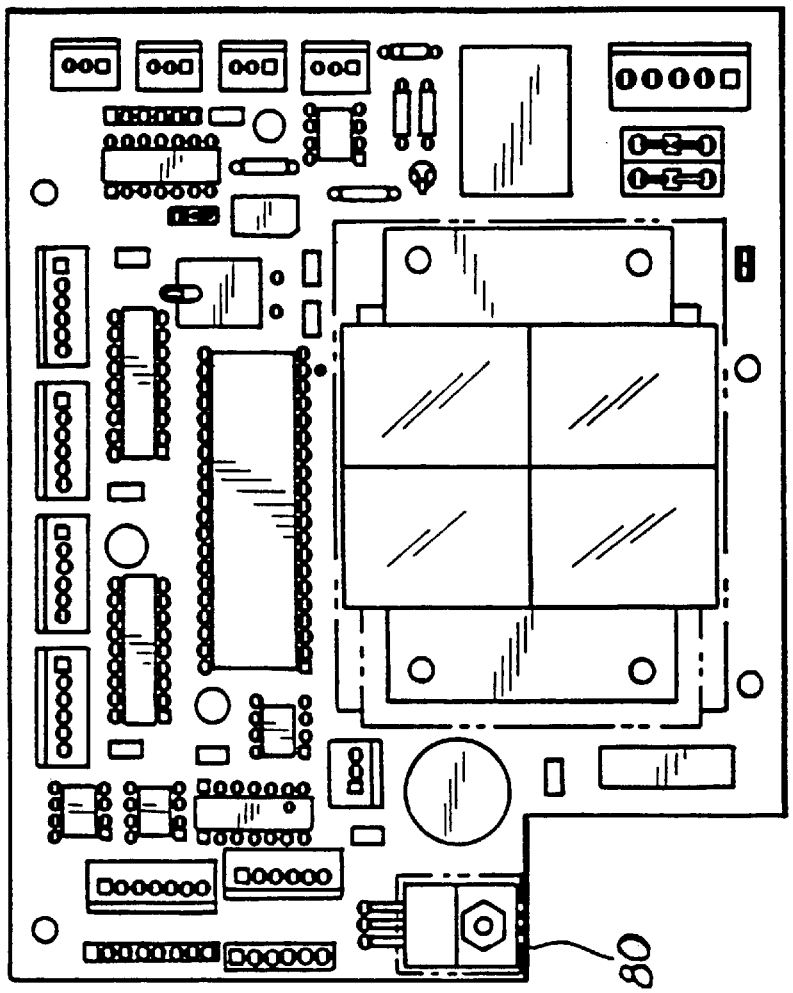
Figure 12D:
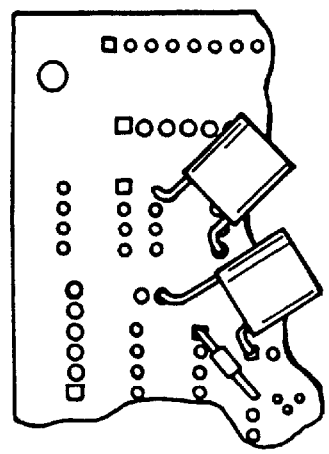
Figure 14A:
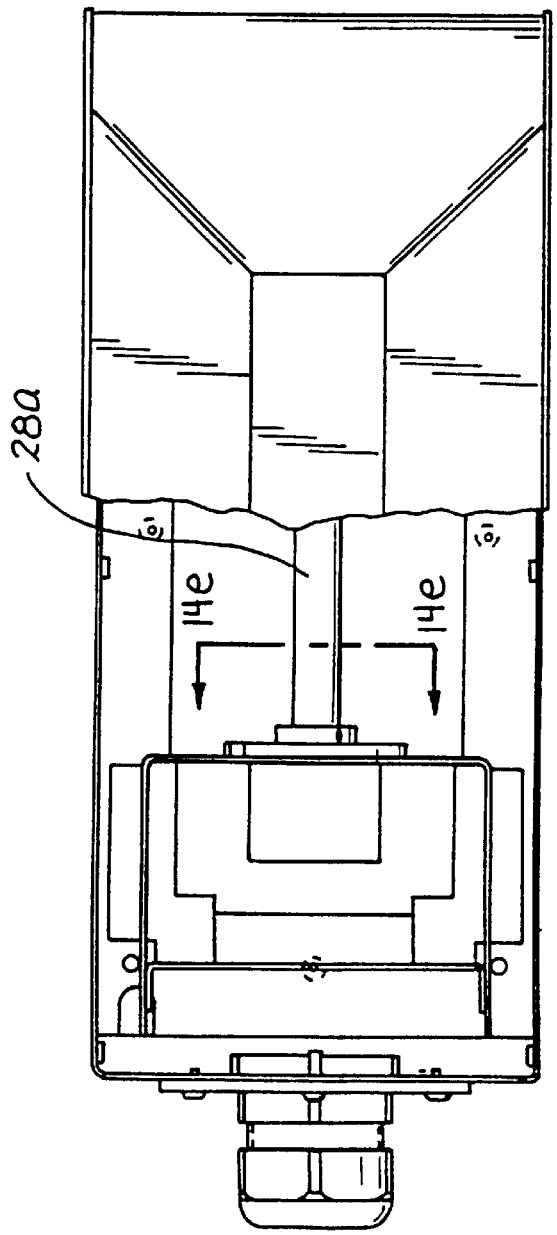
Figure 14E:
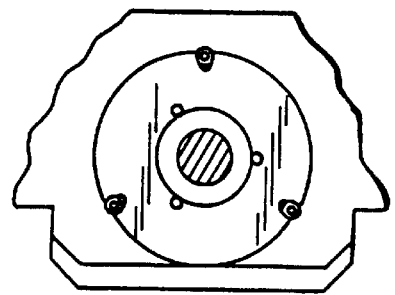
Figure 14C:
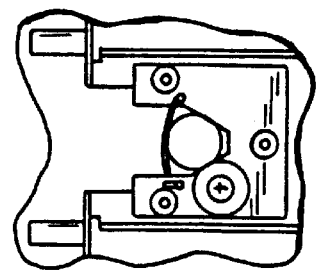
Figure 14B:
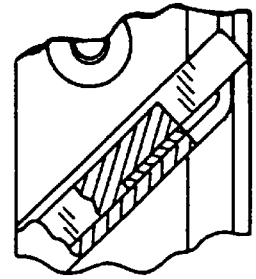

FIGS. 12a–12d illustrate detailed views of the PCA DMX board of FIGS. 10a and 11. The embodiment of FIGS. 12–12c illustrates a PCA DMX board having jumpers to operate from 120 volts AC input power, and the PCA DMX board embodiment of FIG. 12d has jumpers which are set to operate from 240 volts AC input power. The PCA DMX board is presently embodied to provide the following functions. The board provides a platform for storing software, transmits various pulses to various motors per software and user input, and provides DC power for the various motors. The PCA DMX board 80 further provides feedback sensing for motor home positions, and provides a capability for switching the light source 12 on and off from a membrane switch. Color cues for the color wheels 46, 46a can be stored in the PCA DMX board 80, and the PCA DMX board 80 can facilitate manual changing of the colors, as well. Additionally, the PCA DMX board can allow one unit (master) to provide DMX signals in order to drive other units (slaves) in unison with the master unit.

FIG. 13 is a detailed illustration of the side module 76 shown in FIG. 4. A heat shield 94a is disposed between the fold mirror 24a and a back wall 96a of the side module 76. FIGS. 14a–14f illustrate various interior views of the side module 76 components of FIG. 13.

FIGS. 15a–15i illustrate various views of the color wheels 46, 46a, which are adapted for use in either the first side module 76, the second side module 78, or both. As presently embodied, the use of the first color wheel 46 and the second color wheel 46a provides a number of special functions. The two color wheels 46, 46a are preferably used together to allow for a total of ten cells for placement of color filters. Accordingly, more colors are available with use of both of the color wheels 46, 46a. The two color wheels 46, 46a overlap in front of the homogenizer rod 28a, for example. One of the color filters is preferably an aluminum piece, which does not allow light therethrough. This filter can be adjusted over the light beam to provide dimming. The two color wheels 46, 46a together allow for mixing of colors.

Figure 15B:
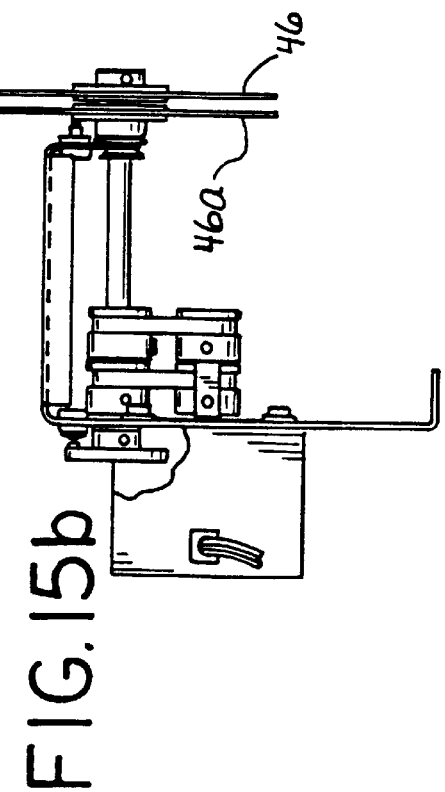
FIGS. 15a–15i are various views of the color wheel assembly, according to the presently preferred embodiment.
Figure 15C:
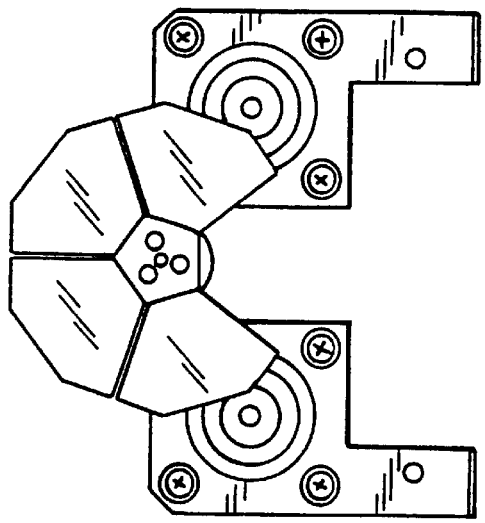
Figure 15A:
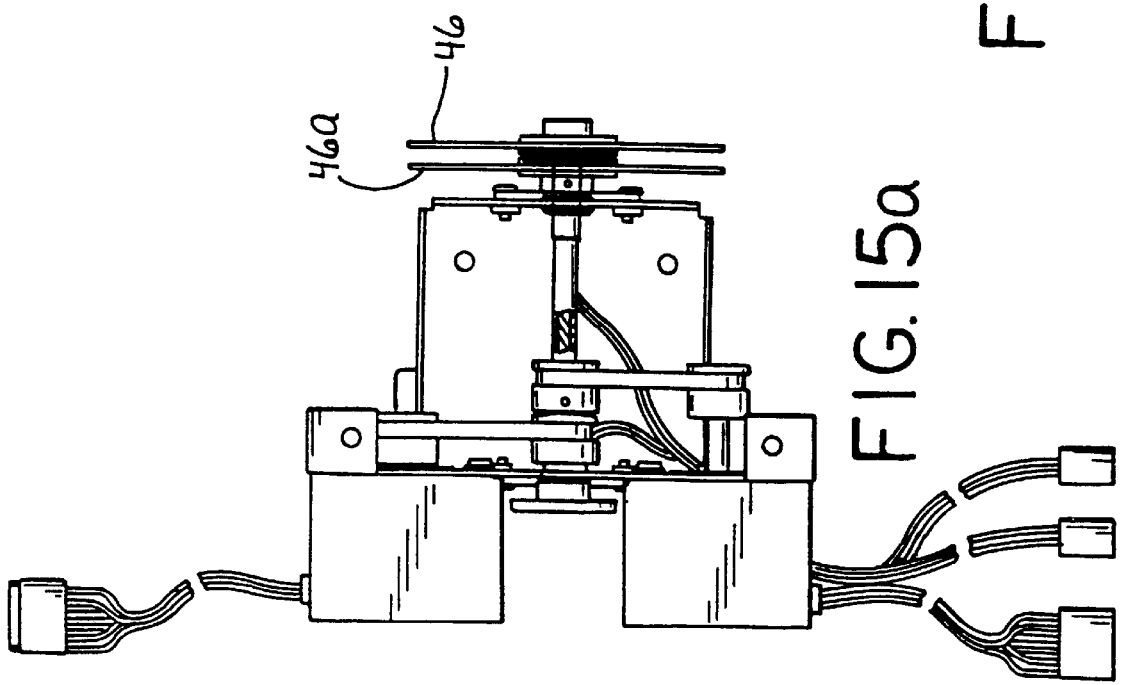
Figure 15D:
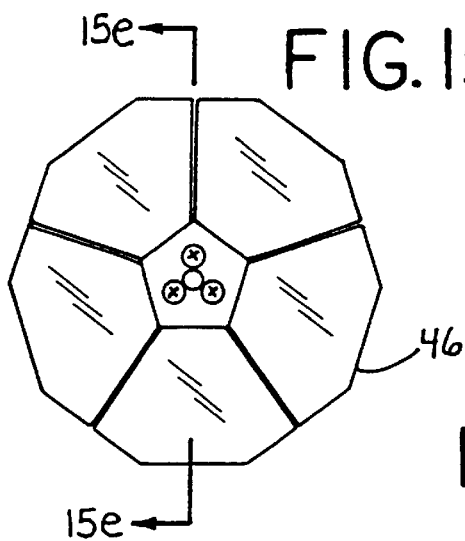
Figure 15E:
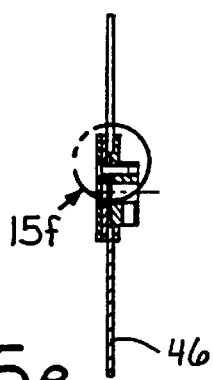
Figure 15F:
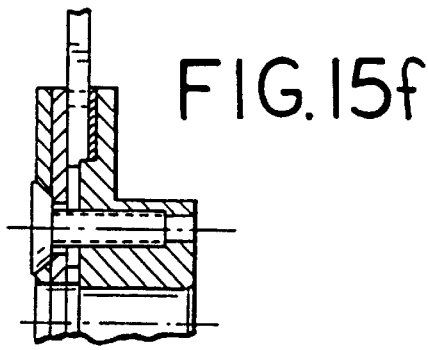
Figure 15G:
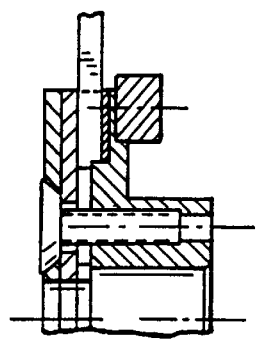
Figure 15H:
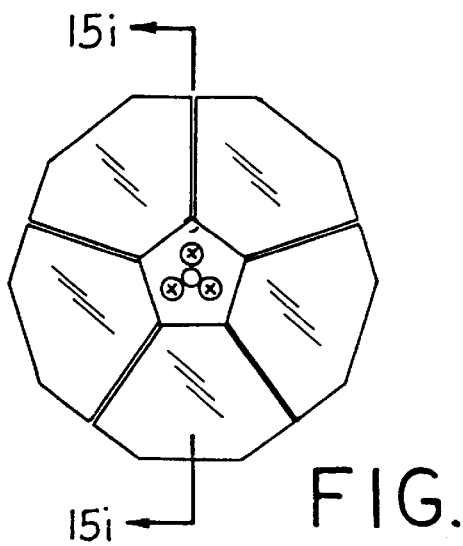
Figure 15I:
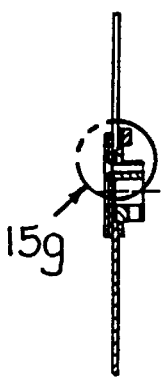
Figure 17A:
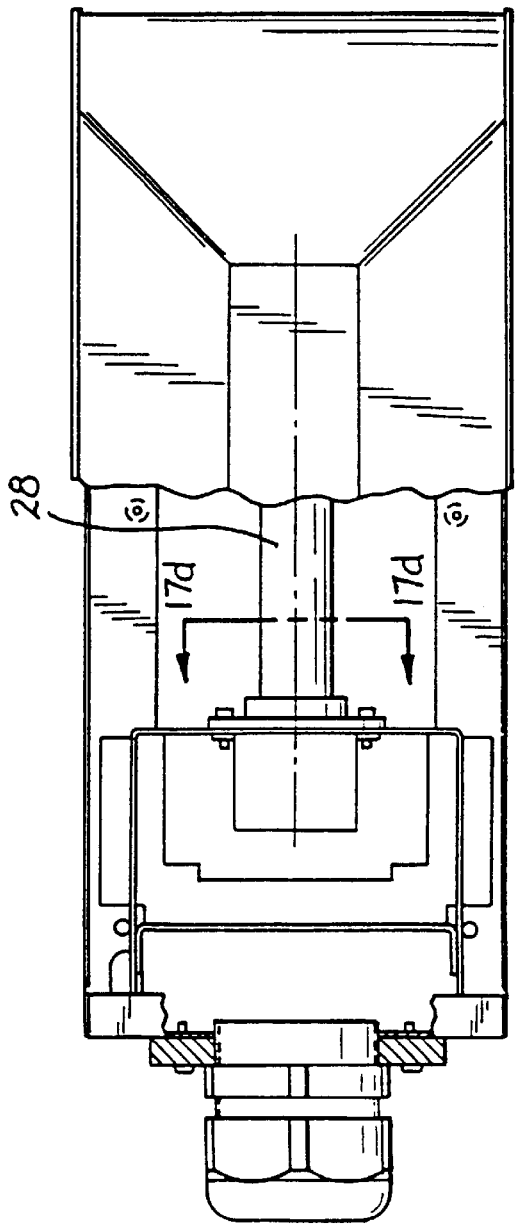
Figure 17E:
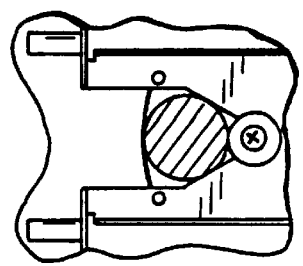
Figure 17D:
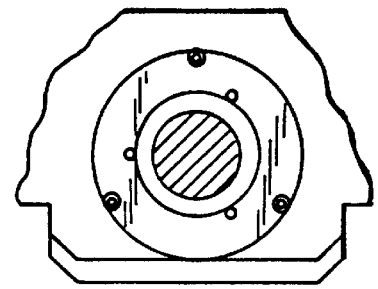
Figure 17B:
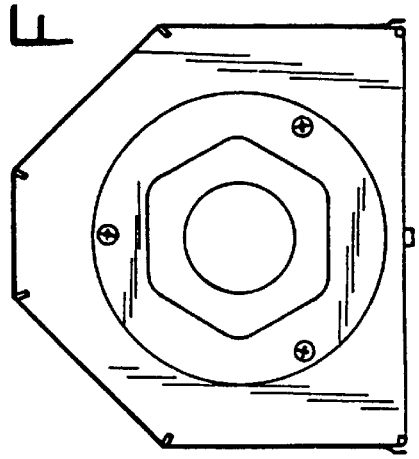

The first color wheel 46 is illustrated in FIGS. 15d–15f. This first color wheel 46 preferably comprises a one-eighth inch bore diameter. The second color wheel 46a is illustrated in FIGS. 15g–15i. This second color wheel 46a preferably comprises a one-fourth inch bore diameter. The two color wheels 46, 46a are configured with different sized bores to thereby facilitate concentric shaft operation. As presently embodied, the one-eighth inch bore diameter shaft of the first color wheel 46 is placed within the one-fourth inch bore diameter shaft of the second color wheel 46a. The motor assembly incorporates various shafts, pulleys and belts to thereby facilitate placement of the first and second color wheels 46, 46a within the optical assembly.

Figure 18A:
FIGS. 18a and 18b illustrate a homogenizer rod for use in the side module of FIGS. 16a and 16b, according to one presently preferred embodiment.
Figure 18B:
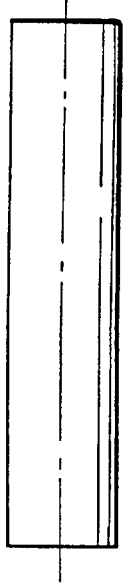
Figure 19B:
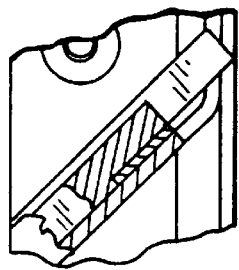
FIGS. 19a and 19b illustrate a second side module configuration, according to one presently preferred embodiment.
Figure 19A:
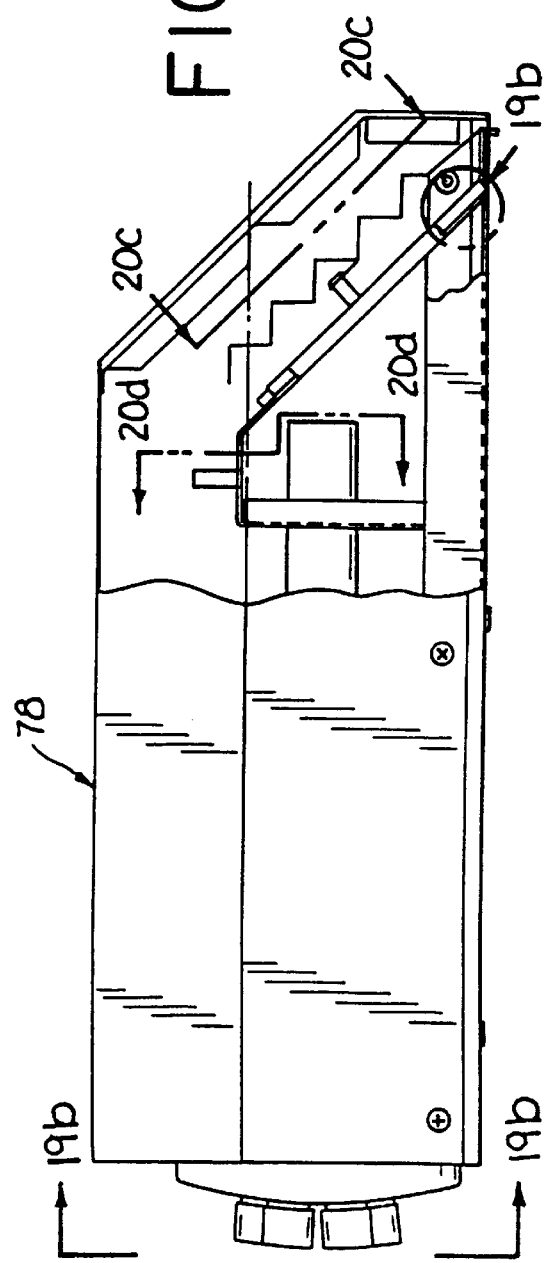
Figure 20A:
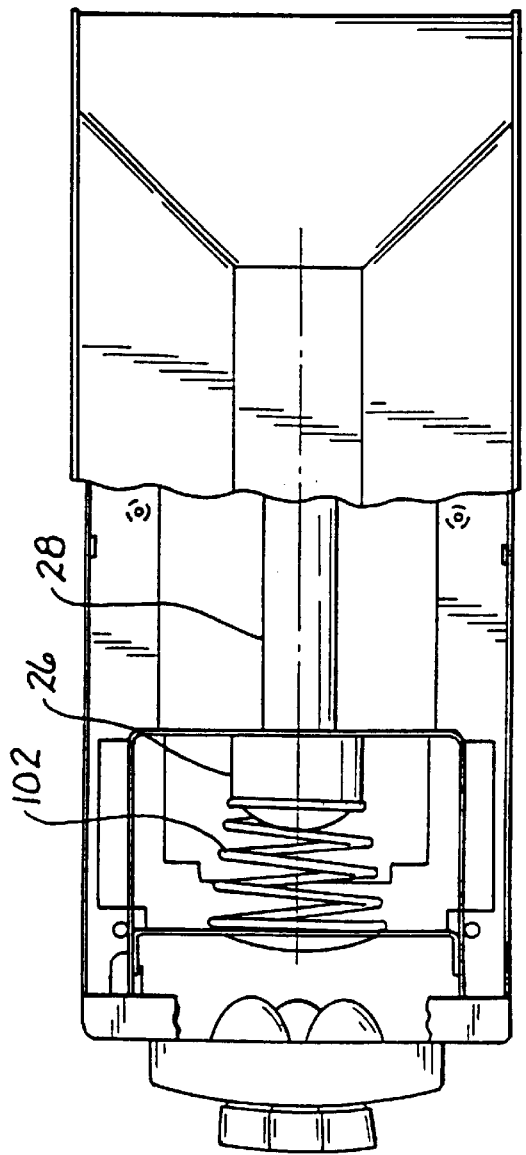
FIGS. 20a–20d are various views of the side module of FIGS. 19a and 19b, according to one presently preferred embodiment.
Figure 20D:
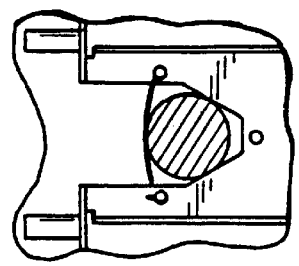
Figure 20C:
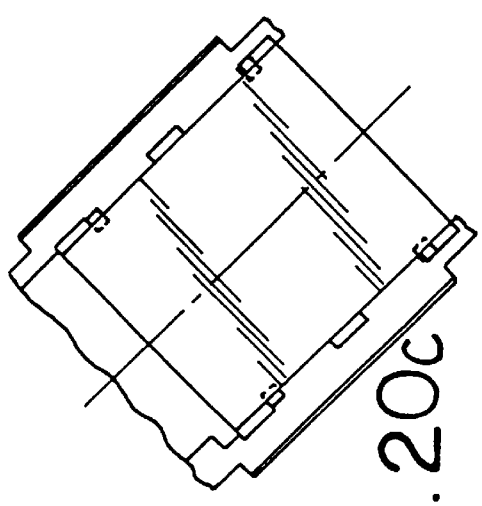
Figure 20B:
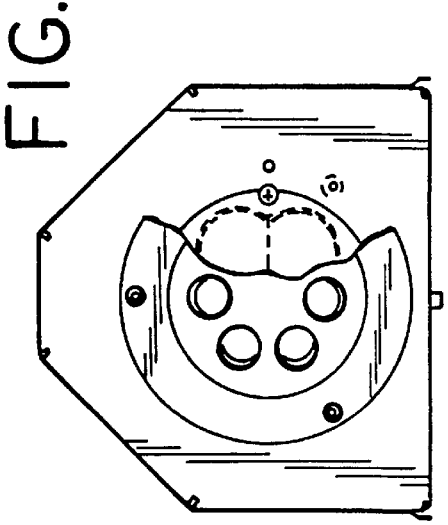

FIGS. 16a and 16b illustrate two views of a first configuration of the second side module 78 of FIG. 6. A heat shield 94 is placed between the fold mirror 24 and the back wall 96. FIGS. 17a–17e illustrate various views of the first configuration of the second side module 78 of FIGS. 16a and 16b. Additionally, FIGS. 18a and 18b illustrate a eight-tenths inch diameter homogenizer rod and a one inch diameter homogenizer rod, respectively. FIGS. 19a and 19b illustrate views of a second configuration of the second side module 78. The side module 78 shown in FIGS. 19a and 19b has a left-hand side cover removed, to thereby expose a ferrule housing assembly 98, which is adapted for housing ferrules 100 (FIG. 25a). FIGS. 20a–20d illustrate various views of the assembly shown in FIGS. 19a and 19b. A spring 102 is positioned between the focussing lens 34 and the field lens 26. The spring 102 pushes against the focussing lens 34 and the field lens 26. These lenses 26 and 34 have grooves cut into them so they can interface with the spring 102 and fit into a round cutout in the sheet metal. By pressing on the lenses as shown in FIG. 20a, for example, the lenses 26 and 34 are retained in the metal base without any screws or adhesive.

FIGS. 21a and 21b illustrate the field lens 26 and the homogenizer rod 28, and FIGS. 22a and 22b illustrate various views of the focussing lens 34. FIGS. 23a–23e illustrate various views of the multi-sector lens 36. As presently preferred, the multi-sector lens 36 comprises six segments. Each segment of the multi-sector lens 36 is adapted for passing light into a corresponding light guide. FIG. 23a is a front-elevational view of the multi-sector lens 36; FIG. 23b is a rear view of the multi-sector lens 36; and FIG. 23c is a side-elevational view of the multi-sector lens 36. FIGS. 23d and 23e are cross-sectional views of the multi-sector lens 36. The multi-sector lens 36 is adapted for being secured to the input end of the ferrule housing assembly 98.

FIGS. 24a–24e illustrate various views of the ferrule housing assembly 98, which is used in the second configuration of the second side module 78, as shown in FIGS. 19a and 19b, for example. The six apertures in the ferrule housing assembly 98 are adapted for accommodating six corresponding ferrules 100 (FIG. 25a). Each ferrule may be configured to correspond to a first configuration, illustrated in FIGS. 25a–25d or a second configuration illustrated in FIGS. 26a–26d. The ferrule 100 in FIGS. 25a–25d generally comprises a small diameter guide end 102 and a larger diameter output end 104. As shown in FIG. 25d, for example, the interior surface of the output end 104 comprises tiny protrusions 106, which are adapted for digging into the jacket of the light guide to thereby securely hold the light guide. The tiny protrusions 106 dig into the jacket of the light guide, when a nut is secured around the outer diameter of the output end 104 of the ferrule 100. Four gaps 110, as illustrated in FIG. 25c, for example, allow the diameter of the output end 104 of the ferrule 100 to decrease, when the nut is tightened around the output end 104 of the ferrule 100. FIGS. 26a–26d illustrate a ferrule 102, which is configured almost identically to the ferrule 100. The ferrule 102 of FIGS. 26a–26d, however, has slightly larger diameters.

Figure 27:
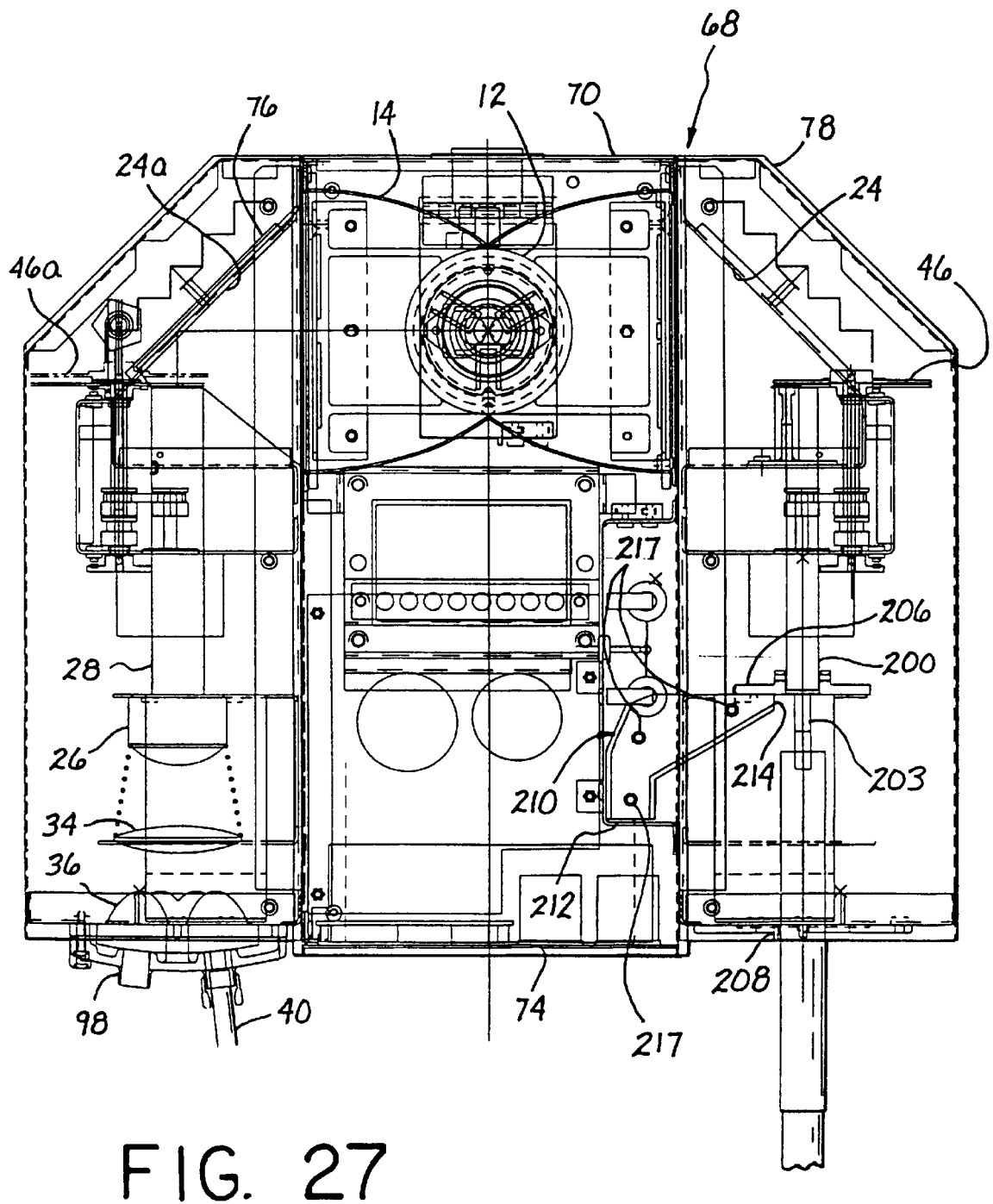
FIG. 27 illustrates a top planar view of a light guide illumination system, having an inventive air duct for cooling an end of a light guide bundle, which receives light from an illumination source.

FIG. 27 illustrates a fiber illumination unit 68 comprising a center module 70, a first side module 76 having a multi-sector lens for focussing light into output light guides 40, and a second side module 78 having a homogenizer rod 200 for directing light into a light guide bundle 203, according to the presently preferred embodiment. The second side module 78 comprises a light guide bundle locator bracket 206. The light guide bundle locator bracket 206 operates to locate a bundle of output light guides within the light exiting from the homogenizer rod 200. An exterior light guide bundle locator 208 also serves to locate and align the light guide bundle at the exit of the assembly.

Although a light guide bundle 203 is used in the second side module 78 in the presently preferred embodiment shown in FIG. 27, other embodiments are also possible. A sector lens 36 may be used, for example, to focus light from the homogenizer rod 200 into one or more output light guides 40. A convex lens (not shown) could also be disposed between the homogenizer rod 200 and the sector lens 36, as another alternative.

A fan 74 is disposed at an end of the center module 70. The fan 74 is adapted to draw air into the center module 76 and to direct the drawn air in a direction toward the illumination source 12. An air stream generated by the fan 74 passes over the illumination source 12 to thereby cool the illumination source 12.

Since a sector lens is not used at the coupling of the homogenizer rod 200 and the light guide bundle 203, a relatively inefficient transfer of light occurs. This relatively inefficient transfer of light from the homogenizer rod 200 to the individual light guides of the light guide bundle 203 results in the generation of thermal energy on the individual light guides of the light guide bundle 203. An air duct 210 having an input end 212 and an output end 214 is used to divert a portion of the stream of air generated by the fan 74.

The input end 212 of the air duct 210 receives a portion of the air stream and directs air through the air duct 210 and out of the output end 214. The air duct 210 extends between the center module 70 and the second side module 78, to thereby route a portion of air generated by the fan 74 in the center module 70 to the coupling between the homogenizer rod 200 and the light guide bundle 203 within the second side module 78.

As presently preferred, the input end 212 has a relatively large cross-sectional area, compared to a cross-sectional area of the output end 214. The relatively large input end 212 is thus able to collect a portion of air from the air stream generated by the fan 74 and to output this air out of the output end 214 at a greater pressure and velocity. A smooth transition is preferably incorporated within the air duct 210 between the large input end 212 and the small output end 214, to reduce air turbulence. Air exiting the output end 214 of the air duct 210 can be directed through the second side module 78 past the fold mirror 24, to thereby provide a secondary function of providing additional cooling to the illumination source 12.

FIG. 28 illustrates a perspective view of the air duct 210, according to the presently preferred embodiment. Rivets 217 are preferably used to secure the various planar members of the air duct 210 together, and fastening apertures 221 are preferably used to secure the air duct 210 to the structure of the center module 70. Additionally, an alignment slot 224 operates to secure the air duct 210 to a structural element of the second side module 78.

FIGS. 29a–29d illustrate four planar members 231, 233, 235, and 237 that fit together to form the air duct 210, according to the presently preferred embodiment. The first planar member 231 preferably comprises at least six bends 242, 244, 246, 248, 250, and 252, and preferably comprises four fastening tabs 261, 263, 265, and 267. The first fastening tab 261 comprises a first rivet aperture 271, the second fastening tab 263 comprises a second rivet aperture 273, the third fastening tab 265 comprises a third rivet aperture 275, and the fourth fastening tab 267 comprises a fourth rivet aperture 277. Optional sixth and seventh bends 278 and 279 may be formed to facilitate fitting of the air duct 210 to the structure of the center module 70.

The second planar member 233 comprises a first bend 282, a second bend 284, a third bend 286, a fourth bend 288, and a fifth bend 290. The second planar member 233 comprises a first fastening tab 301 having a first rivet aperture 311, a second fastening tab 303 having a second rivet aperture 313, a third fastening tab 305 having a third rivet aperture 315, and a fourth fastening tab 307 having a third rivet aperture 317. The third planar member 235 shown in FIG. 29c and the fourth planar member 237 shown in FIG. 29d preferably comprise no bends. The third planar member 235 comprises a first rivet aperture 331, a second rivet aperture 333, and a third rivet aperture 335. Similarly, the fourth planar member 237 preferably comprises a fourth rivet aperture 341, a second rivet aperture 343, and a third rivet aperture 345. As presently embodied, the first planar member 231, the second planar member 233, the third planar member 235, and the fourth planar member 237 all comprise aluminum. Although rivets and rivet apertures are used for securing the planar members 231, 233, 235, and 237 together, other conventional securing means may be used.

The first rivet aperture 271 of the first planar member 231 is secured to both the first rivet aperture 311 of the second planar member 233 and the first rivet aperture 331 of the third planar member 235. The second rivet aperture 273 of the first planar member 231 is secured to the second rivet aperture 333 of the third planar member 235. The third rivet aperture 313 of the second planar member 233 is secured to the third rivet aperture 335 of the third planar member 235. Similarly, the fourth rivet aperture 277 of the first planar member 231 is secured to both the fourth rivet aperture 317 of the second planar member 233 and the fourth rivet aperture 341 of the fourth planar member 237. The fifth rivet aperture 275 of the first planar member 231 is secured to the fifth rivet aperture 343 of the fourth planar member 237. Finally, the sixth rivet aperture 315 of the second planar member 233 is secured to the sixth rivet aperture 345 of the fourth planar member 237.

Although exemplary embodiments of the invention have been shown and described, many changes, modifications, and substitutions may be made by one having ordinary skill in the art without necessarily departing from the spirit and scope of this invention.

What is claimed is:

1. A light guide illumination system, comprising:
    a housing having a center portion, a side portion, a first end, and a second end;
    an illumination source disposed in said center portion at the second end of said housing and being adapted to emit light and to generate heat;
    a fan disposed in the center portion at the first end of the housing and being adapted to direct a stream of air through said center portion from the first end to the second end of the housing and over the illumination source to thereby transfer heat generated by the illumination source away from the illumination source;
    at least one light guide disposed in said housing side portion, said at least one light guide having a proximal end and a distal end;
    a curved reflector adapted to direct light from the illumination source in a direction along an optical path from said housing center portion to said housing side portion and toward the proximal end of the at least one light guide; and
    an air routing duct disposed near said fan at the first end of the housing for diverting a portion of the air flowing through said center portion of the housing from the center portion to the side portion of the housing, the duct having an input end extending into the center portion and an output end extending into the side portion, so that the diverted portion of air flows over the proximal end of said at least one light guide.

2. The light guide illumination system as recited in claim 1, the at least one light guide comprising a light guide bundle.

3. The light guide illumination system as recited in claim 1, the input end of the air routing duct having a cross-sectional area which is greater than a cross-sectional area of the output end of the air routing duct.

4. The light guide illumination system as recited in claim 3, the air routing duct comprising aluminum.

5. The light guide illumination system as recited in claim 1, and further comprising a homogenizer rod adapted to receive light from the curved reflector and to output homogenized light onto the at least one light guide.

6. The light guide illumination system as recited in claim 5, further comprising a fold mirror disposed between the curved reflector and the homogenizer rod.

7. The light guide illumination system as recited in claim 6, further comprising at least one color wheel disposed between the curved reflector and the light guide bundle.

8. The light guide illumination system as recited in claim 7, the at least one color wheel being disposed between the homogenizer rod and the light guide bundle.

9. The light guide illumination system as recited in claim 1, wherein said housing center portion and said housing side portion comprise discrete and separable center and side modules, respectively.

10. The light guide illumination system as recited in claim 1, wherein said at least one light guide comprises a light guide bundle.

11. A light guide illumination system, comprising:
    an illumination source adapted to emit light and to generate heat;
    a fan adapted to direct a stream of air over the illumination source to thereby transfer heat generated by the illumination source away from the illumination source;
    at least one light guide having a proximal end and a distal end;
    a reflector adapted to direct light from the illumination source in a direction along an optical path toward the proximal end of the light guide; and
    an air duct for routing air onto an end of said at least one light guide, said air duct comprising a housing having a first sheet of material, a second sheet of material, a third sheet of material, and a fourth sheet of material, the first sheet of material and the second sheet of material being secured to one another and forming an input end and an output end, the third sheet of material being secured between the first sheet of material and the second sheet of material, and the fourth sheet of material being secured opposite the third sheet of material between the first sheet of material and the second sheet of material.

12. The light guide illumination system as recited in claim 11, wherein the output end is disposed in close proximity with the at least one light guide to thereby cool the at least one light guide when light is focused onto the proximal end thereof.

13. The light guide illumination system as recited in claim 11, wherein the air duct comprises aluminum.

14. The light guide illumination system as recited in claim 11, wherein the first sheet of material comprises eight bends and the second sheet of material comprises five bends.

15. A light guide illumination system, comprising:
    an illumination source adapted to emit light and to generate heat;
    a fan adapted to direct a stream of air over the illumination source to thereby transfer heat generated by the illumination source away from the illumination source;

at least one light guide having a proximal end and a distal end;

a reflector adapted to direct light from the illumination source in a direction along an optical path toward the proximal end of the light guide; and an air duct for routing air onto an end of said at least one light guide, said air duct comprising a housing having a first sheet of material and a second sheet of material, the first sheet of material and the second sheet of material being secured to one another and forming an input end and an output end, wherein the first and second sheets of material each have bent portions, and a plurality of mechanical fasteners are employed to secure the first and second sheets of material to one another.

16. The light guide illumination system as recited in claim 15, wherein said air duct further comprises a third sheet of material and a fourth sheet of material.

17. The light guide illumination system as recited in claim 16, wherein the third sheet of material is secured between the first sheet of material and the second sheet of material, and the fourth sheet of material is secured opposite the third sheet of material between the first sheet of material and the second sheet of material.

18. The light guide illumination system as recited in claim 11, wherein said mechanical fasteners comprise rivets.

19. The light guide illumination system as recited in claim 11, wherein said air duct further comprises a third sheet of material and a fourth sheet of material, the third sheet of material and the fourth sheet of material having substantially flat surfaces, which are not bent, and the third sheet of material and the fourth sheet of material being secured to the first sheet of material and the second sheet of material using mechanical fasteners.

20. A light guide illumination system, comprising:

an illumination source adapted to emit light and to generate heat;

a fan adapted to direct a stream of air over the illumination source to thereby transfer heat generated by the illumination source away from the illumination source;

at least one light guide having a proximal end and a distal end;

a reflector adapted to direct light from the illumination source in a direction along an optical path toward the proximal end of the light guide; and an air duct for routing air onto an end of said at least one light guide, said air duct comprising a housing having a first sheet of material and a second sheet of material, the first sheet of material and the second sheet of material being secured to one another and forming an input end and an output end, wherein said input end has a first cross-sectional area and said output end has a second cross-sectional area, the first cross-sectional area being greater than the second cross-sectional area.

* * * * *